(12) United States Patent
Heckmann et al.

(10) Patent No.: US 12,499,035 B2
(45) Date of Patent: Dec. 16, 2025

(54) SYSTEMS AND METHODS FOR INTEGRATED DESIGN, ASSESSMENT AND REMEDIATION OF WEB PAGES

(71) Applicant: OPEN TEXT HOLDINGS, INC., Menlo Park, CA (US)

(72) Inventors: Markus Heckmann, Buhren (DE); Paul Kieron Carl Narth, San Carlos, CA (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 157 days.

(21) Appl. No.: 18/344,248

(22) Filed: Jun. 29, 2023

(65) Prior Publication Data

US 2024/0012740 A1  Jan. 11, 2024

Related U.S. Application Data

(60) Provisional application No. 63/359,089, filed on Jul. 7, 2022.

(51) Int. Cl.
| | | |
|---|---|---|
| *G06F 11/3698* | (2025.01) | |
| *G06F 8/20* | (2018.01) | |
| *G06F 16/958* | (2019.01) | |
| *G06F 40/143* | (2020.01) | |
| *G06F 40/166* | (2020.01) | |

(52) U.S. Cl.
CPC ............ *G06F 11/3698* (2025.01); *G06F 8/20* (2013.01); *G06F 16/986* (2019.01); *G06F 40/166* (2020.01); *G06F 40/143* (2020.01)

(58) Field of Classification Search
CPC .. G06F 11/3698; G06F 16/986; G06F 40/166; G06F 8/20; G06F 40/143
USPC .................................................. 717/105–121
See application file for complete search history.

(56) References Cited

U.S. PATENT DOCUMENTS

| | | | | |
|---|---|---|---|---|
| 6,907,565 B1* | 6/2005 | Huang | ................... | G06F 40/169 715/234 |
| 7,536,641 B2* | 5/2009 | Rosenstein | ............ | G06F 40/186 715/752 |
| 7,698,631 B1* | 4/2010 | Toebes | ................... | G06F 40/143 715/234 |
| 7,877,260 B2* | 1/2011 | Takagi | ...................... | G06F 3/16 715/728 |
| 7,949,962 B1* | 5/2011 | Pham | .................... | G06F 40/166 715/851 |
| 8,069,435 B1* | 11/2011 | Lai | .......................... | H04L 67/51 717/106 |
| 8,522,134 B1* | 8/2013 | Zetlen | ................... | G06F 40/117 715/234 |
| 8,555,159 B1* | 10/2013 | Shmulevich | .......... | G06F 40/134 715/255 |

(Continued)

OTHER PUBLICATIONS

Chaqfeh et al, "JSAnalyzer: A Web Developer Tool for Simplifying Mobile Web Pages through Non-critical JavaScript Elimination", ACM, pp. 1-3 (Year: 2022).*

(Continued)

*Primary Examiner* — Anil Khatri
(74) *Attorney, Agent, or Firm* — SPRINKLE IP LAW GROUP

(57) ABSTRACT

A web editing environment integrated with a web assessment platform for auditing and ameliorating a web page under design in the context of the editing environment is disclosed.

15 Claims, 19 Drawing Sheets

(56) References Cited

U.S. PATENT DOCUMENTS

| | | | | |
|---|---|---|---|---|
| 8,689,181 B2* | 4/2014 | Biron, III | ............... | H04L 67/10 |
| | | | | 717/115 |
| 8,983,635 B2* | 3/2015 | Kolenc | ................. | G06Q 10/06 |
| | | | | 702/182 |
| 10,402,064 B1* | 9/2019 | Al-Sallami | ........... | G06F 40/186 |
| 2007/0061877 A1* | 3/2007 | Sima | ...................... | H04L 63/12 |
| | | | | 726/12 |
| 2009/0031225 A1* | 1/2009 | Toebes | ................. | G06F 16/972 |
| | | | | 715/760 |
| 2015/0310123 A1* | 10/2015 | Dong | ....................... | G06F 8/33 |
| | | | | 715/234 |

OTHER PUBLICATIONS

Taguchi et al, "A Visual Approach for Generating Server Page Type Web Applications Based on Template Method", IEEE, pp. 1-3 ( Year: 2003).*

Bajaj et al, "Mining Questions Asked by Web Developers", ACM, pp. 1-10 (Year: 2014).*

Meyerovich et al, "Fast and Parallel Web Page Layout", ACM, pp. 1-10 (Year: 2010).*

Goto et al, "Visual Web Page Editor with Local Image Display Function", IEEE, pp. 1-5 (Year: 2023).*

* cited by examiner

```
"image-alt": {
    "id": "image-alt",
    "title": "Image elements do not have '[alt]' attributes",
    "description": "Informative elements should aim for short, descriptive alternate text. Decorative elements can be ignored with an em
    "score": 0,
    "scoreDisplayMode": "binary",
    "details": {
        "type": "table",
        "headings": [...
        ],
        "items": [
            {
                "node": {
                    "type": "node",
                    "lhId": "4-15-IMG",
                    "path": "0,HTML,1,BODY,1,DIV,1,DIV,1,DIV,0,DIV,0,DIV,2,DIV,0,SPAN,0,DIV,0,DIV,0,DIV,0,DIV,0,P,2,IMG",
                    "selector": "div > div > p > img",
                    "boundingRect": {...
                },
                "snippet": "<img src=\"/iw/cci/meta/no-injection/iw-mount/default/main/Markus/WCAG/WORKAREA/defaul...\" alt=\"\" width=\"510\"
                "nodeLabel": "",
                "explanation": "Fix all of the following: \n Element has an alt attribute containing only a space character, which is not ig
            }
        ],
        "debugData": {
            "type": "debugdata",
            "impact": "critical",
            "tags": [
                "cat.text-alternatives",
                "wcag2a",
                "wcag111",
                "section508",
                "section508.22.a",
                "ACT"
            ]
        }
    }
}
```

SYSTEMS AND METHODS FOR INTEGRATED DESIGN, ASSESSMENT AND REMEDIATION OF WEB PAGES

RELATED APPLICATIONS

This application claims the benefit of priority of U.S. Provisional Patent Application Ser. No. 63/359,089 by Heckmann and Narth, entitled "SYSTEMS AND METHODS FOR INTEGRATED DESIGN, ASSESSMENT AND REMEDIATION OF WEB PAGES" filed on Jul. 7, 2022, which is fully incorporated herein by reference for all purposes.

TECHNICAL FIELD

This disclosure relates generally to the management and development of web content. More particularly, this disclosure relates to embodiments of systems and methods for developing web pages (e.g., designs of such web pages) or other components for use in web content management and development. Even more specifically, this disclosure relates to embodiments of systems and methods for integrating assessment and remediation of such web pages with the design of these web pages, and the automated assessment and remediation of such pages.

BACKGROUND

Ever since the advent of the Internet, web sites have been steadily growing more complicated, encompassing an ever-expanding amount of increasingly complex content. In part, this complexity stems from the desire to optimize web pages for a seemingly ever expanding set of criteria. This criteria includes accessibility standards, performance criteria, search engine optimization or other optimization criteria.

As an example, accessibility standards are an important part of the development of web pages. To illustrate, today, around 3.3 million Americans over the age of 40 are blind or have low-vision—a number that will surpass 5 million within the next decade. In addition, over 21 million Americans have profound visual impairments that require large print documents. A vast majority of these individuals desire to access the increasing amount of online information. However, these individuals are often unable to access such online information, as it is presented exclusively in a digital manner.

Many visually impaired individuals use assistive technologies to access digital information. Such assistive technologies range from screen readers to Braille printers. However, many documents and websites are not designed to be compatible with assistive technologies.

The World Wide Web Consortium (W3C) has developed guidelines for technology products. These Web Content Accessibility Guidelines (WCAG) are part of a series of Web accessibility guidelines published by the W3C's Web Accessibility Initiative. They consist of a set of guidelines on making content accessible, primarily for disabled users, but also for devices such as highly limited devices, such as mobile phones. The WCAG states that websites, software products and electronic documents should be built to work with assistive technologies. In particular, these guidelines specify that accessible documents include a plurality of tags, where the plurality of tags conform to a set of accessibility standards for generating documents compatible with an accessibility product for visually impaired individuals.

It is, however, difficult for web developers to ascertain whether the web pages they have developed are compliant with such guidelines, as the web developers may not themselves be aware of the intricacies of such standards or may have vastly different levels of skill when it comes to such web page development.

The desire to comply with accessibility standards, and the difficulty with such compliance, is thus a microcosm of a more general problem. Namely, how can compliance with certain web page criteria, including optimization criteria, be assured in the design and development of such web pages.

What is desired then, is a way to improve web content development to assist compliance with such criteria.

SUMMARY

To continue with the above discussion, while web developers desire to comply with a variety of optimization or other web page criteria is desired, it is often difficult for web developers to ascertain whether the web pages they have developed are compliant with such criteria. In part this difficulty may stem from the lack of familiarity web developers may have with these standards, or the lack of skills developers may have when it comes to this type of compliance.

Accordingly, one problem in the context of such web page development is assuring that the web pages under development are compliant with these web page criteria.

To assist in such optimizations and other compliance, certain web page assessment platforms have been developed. These web page assessment platforms offer a tool whereby a web page can be submitted and the web page audited against certain criteria. For example, Google® Lighthouse is an application accessible through an interface (e.g., a web services interface or API of an incorporated library, etc.) that can audit the performance, accessibility or search engine optimization of web pages.

Thus, for example, a web page can be submitted to Google® Lighthouse and a score for a criteria, such as accessibility can be returned by Google® Lighthouse along with elements of the submitted web page that are problematic, negatively affected the returned score or otherwise failed an accessibility criteria.

Developers can thus use these web page assessment platforms to evaluate their web pages. Many developers, however, may not have the knowledge to assess their web pages to determine where their web pages are deficient with respect to the criteria used to assess the web page. To put it more explicitly, web assessment platforms may return a report identifying elements of the assessed web page that negatively affected the assessment of the web page (termed failing elements). This report may be in a format that is not easily understandable by a human. As but one example, Google® Lighthouse may return a JavaScript® Object Notation (JSON) report having a set of JSON objects identifying failing elements of a web page and a description of the reason that element failed. Understanding such a report or identifying the failing elements identified in the report in the actual web page may be difficult for a user, especially a user that is lacking in technical expertise.

Additionally, using such web assessment platforms may require manual steps that fall outside of the typical development or deployment scenarios for web page development. For example, many times web developers may use design tools (editors) to design such web pages and moreover, may design such web pages in the context of a workflow for the design, generation, publication or deployment of such web pages.

Web design tools typically allow a user to design a template or page using a set of components in a design environment. In many cases, these templates and page designs specify how a web page or set of web pages should appear. In many cases, the web editors may allow a user to publish or deploy such web pages as part of a workflow (or allow the web pages to be moved to a subsequent step of a workflow such as review for publishing or deployment).

Thus, to assess a web page using such web assessment platforms, a user usually has to generate actual web page content from the template or page design and go outside the design environment (e.g., the web editor) to submit the generated web page to the web assessment platform. Once the response is received from the web assessment platform (e.g., the score or the specification of any elements that failed the assessment criteria), the user then has to re-enter the design environment, attempt to locate the problematic elements of the web page in the design of that web page and make corrections in the design of the template or web page.

What is desired then, is a way to improve web content development. Specifically, what is desired are systems and methods to integrate the assessment of web page and templates into a web page editing environment including the automation of the correction of such web pages or templates based on such assessments.

To those ends, among others, attention is now directed to the embodiments of systems and methods for web content development disclosed herein. Specifically, embodiments as disclosed may provide a web editing environment integrated with a web assessment platform for auditing a web page under design in the context of the editing environment. A web editor can obtain a generated web page generated from a web page being designed in the web editor and submit the web page to a web assessment platform such as Google® Lighthouse or the like. Such an audit may, for example, be requested by a user through an interaction with the web editor or automatically instituted by the web editor based on the occurrence of an event (e.g., occurring in association with the web editor).

For example, the audit may be performed in the context of editing, publishing, or deployment of a web page. Thus, for instance, an embodiment of a web editor may allow a user to institute a portion or step of a workflow associated with the editing, publishing or deployment of a web page undergoing editing. In these instances, the web editor may present a button or menu option to institute a step of a workflow (e.g., a "publish" or "deploy" button). In this manner, the audit may be performed substantially automatically for every web page as part of a publish or deployment workflow instituted by an entity (e.g., an enterprise or the like) with respect to the editing, publishing or deployment of such web pages using the web editing environment.

The submission may request an audit for one or more areas of optimization or criteria such as accessibility, search engine optimization, or performance. The web editor can receive an audit report (where that audit report may include an audit score or other audit information for the web page) from the web assessment platform and present the web audit data (e.g., the score) for the criteria in the context of the editing of the web page in the web editor.

In some cases, the web editor may not allow a step in a workflow (e.g., a next step in a workflow requested by a user such as publish or deploy) to proceed if the audit score returned from the web assessment platform is below a certain threshold (e.g., a threshold score associated with an area of optimization). Moreover, according to some embodiments the web editor may present the web audit report in the context of the web editor or may identify (e.g., present, highlight, etc.) web elements identified as failing by the web audit report in the context of the editing of the web page in the web editor.

To illustrate, an audit report may include an identification of an element identified as failing and a reason for the element failing. This identification can, for example, comprise a tag (e.g., an HTML tag associated with the failing element or an identification of the node (e.g., a path of the node) of the HTML or the Document Object Model (DOM) of the rendered HTML). The web editor can thus compare the identification of the failing element in the audit report with the HTML of the web page being edited (or a DOM of the HTML) to identify the failing element. This failing element can then be identified as failing in the context of the editing of the web page in the web editor such as by highlighting the failing element in a What-You-See-Is-What-You Get (WYSIWYG) (or other) type of presentation of the web page, or presenting the failing element in a portion of the interface of the editor.

To assist in identifying failing elements, in one embodiment, when HTML for a web page is generated for a web page being designed in the web editor, the web editor may insert element identifiers into the generated HTML in association with each of the elements of the generated HTML. Such an insertion may occur, for example, when the web page being edited in the editor is rendered for presentation in the editor. Here, the DOM of the editor may itself include the HTML for that web page being edited in the editor. The web editor can thus decorate the HTML of the elements of that web page in the DOM with the appropriate element identifiers. These element identifiers may be random or generated algorithmically and may be unique for each element (e.g., may uniquely identify the element). They may, for example, be an identifier inserted into an HTML tag or other markup of the corresponding HTML element.

In this manner, if the audit report includes a portion of the HTML of a failing element, that HTML included in the audit report for the failing element will include that identifying tag. Thus, the identifying tag for a failing element may be obtained from the portion of the audit report corresponding to the failing element, and the corresponding failing element identified in the generated HTML using that unique identifier.

In another embodiment, the web editor may identify the HTML node path for a failed element from the portion of the audit report corresponding to the failed element. The DOM of the generated HTML for the web page (e.g., as included in the DOM of the editor itself) can then be traversed by the web editor to identify the HTML corresponding to that failed element.

In certain embodiments, the web editor may not only identify failing elements of the web page being edited in the web editor but may identify, or take, remedial action with respect to one or more of the identified failing elements of the web page undergoing editing in the editing environment.

Specifically, as audit reports may identify failing elements and a reason or title (used here interchangeably) for the element failing, a web editor may be configured with a mapping between reasons and one or more remedial actions (referred to the remedial action table). The web editor can thus iterate through each of the failing elements identified in the audit report received from the web assessment platform to extract the identification of an element and the reason for the element failing from the audit report. The reason can be used to index the remedial action table to determine if there is a corresponding remedial action associated with the action.

If there is a remedial action, this remedial action can be identified to a user by the web editor in association with the identification of the failing element in the context of the editing of the web page in the web editor. The user can then select to take (or not take) the recommended remedial action for the failing element. Alternatively, when a remedial action is determined for a reason corresponding to an element identified as failing in the audit report, the remedial action may be automatically taken by the web editor on the web page (e.g., by modifying the web page design according to the remedial action determined).

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
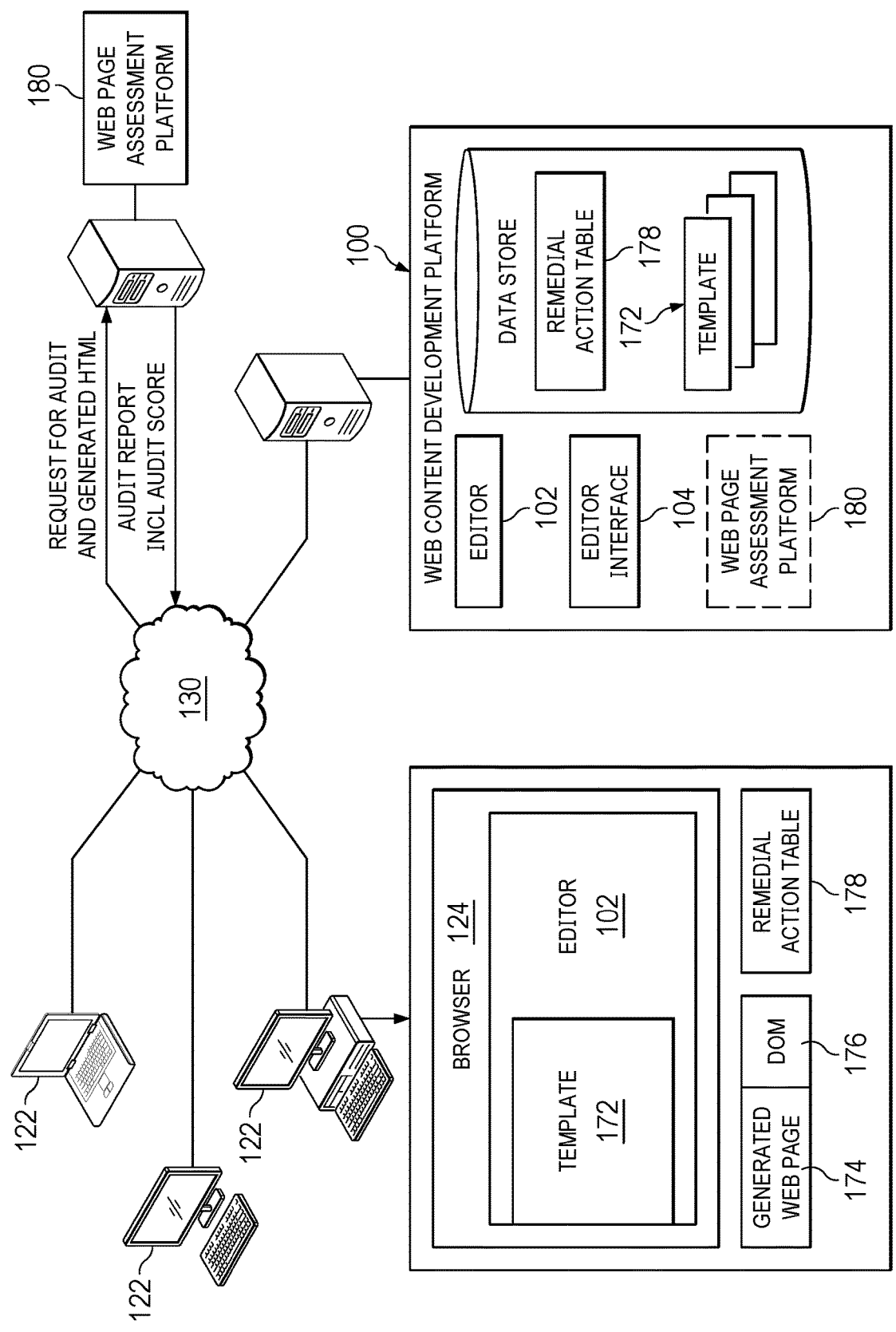
FIG. 1 is a diagrammatic representation of an architecture for web content development including an embodiment of a web content editor adapted for the assessment and remediation of web content, including web pages or templates.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some brief context may be helpful. Ever since the advent of the Internet, web sites have been steadily growing more complicated, encompassing an ever-expanding amount of increasingly complex content. In part, this complexity stems from the desire to optimize web pages for a seemingly ever expanding set of criteria. This criteria includes accessibility standards, performance criteria, search engine optimization or other optimization criteria.

As an example, accessibility standards are an important part of the development of web pages. To illustrate, today, around 3.3 million Americans over the age of 40 are blind or have low-vision—a number that will surpass 5 million within the next decade. In addition, over 21 million Americans have profound visual impairments that require large print documents. A vast majority of these individuals desire to access the increasing amount of online information. However, these individuals are often unable to access such online information, as it is presented exclusively in a digital manner.

Many visually impaired individuals use assistive technologies to access digital information. Such assistive technologies range from screen readers to Braille printers. However, many documents and websites are not designed to be compatible with assistive technologies.

The World Wide Web Consortium (W3C) has developed guidelines for technology products. These Web Content Accessibility Guidelines (WCAG) are part of a series of Web accessibility guidelines published by the W3C's Web Accessibility Initiative. They consist of a set of guidelines on making content accessible, primarily for disabled users, but also for devices such as highly limited devices, such as mobile phones. The WCAG states that websites, software products and electronic documents should be built to work with assistive technologies. In particular, these guidelines specify that accessible documents include a plurality of tags, where the plurality of tags conform to a set of accessibility standards for generating documents compatible with an accessibility product for visually impaired individuals.

It is, however, difficult for web developers to ascertain whether the web pages they have developed are compliant with such guidelines, as the web developers may not themselves be aware of the intricacies of such standards or may have vastly different levels of skill when it comes to such web page development.

The desire to comply with accessibility standards, and the difficulty with such compliance, is thus a microcosm of a more general problem. Namely, how can compliance with certain web page criteria, including optimization criteria, be assured in the development of such web pages.

To assist in such optimizations, certain web page assessment platforms have been developed. These web page assessment platforms offer a tool whereby a web page can be submitted and the web page audited against certain criteria. For example, Google® Lighthouse is an application accessible through an interface (e.g., a web services interface or API) that can audit the performance, accessibility or search engine optimization of web pages. Thus, for example, a web page can be submitted to Google® Lighthouse and a score for a criteria, such as accessibility can be returned by Google® Lighthouse along with elements of the submitted web page that are problematic, negatively affected the returned score or otherwise failed an accessibility criteria.

Developers can thus use these web page assessment platforms to evaluate their web pages. Many developers, however, may not have the knowledge to assess their web pages to determine where their web pages are deficient with respect to the criteria used to assess the web page. To put it more explicitly, web assessment platforms may return a report identifying elements of the assessed web page that negatively affected the assessment of the web page (termed failing elements). This report may be in a format that is not easily understandable by a human. As but one example, Google® Lighthouse may return a JavaScript® Object Notation (JSON) report having a set of JSON objects identifying failing elements of a web page and a description of the reason that element failed. Understanding such a report or identifying the failing elements identified in the report in the actual web page may be difficult for a user, especially a user that is lacking in technical expertise.

Additionally, using such web assessment platforms may require manual steps that fall outside of the typical development or deployment scenarios for web page development. For example, many times web developers may use design tools (editors) to design such web pages and moreover, may design such web pages in the context of a workflow for the design, generation, publication or deployment of such web pages. Web design tools typically allow a user to design a template or page using a set of components in a design environment. In many cases, these templates and page designs specify how a web page or set of web pages should appear. In many cases, the web editors may allow a user to publish or deploy such web pages as part of a workflow (or allow the web pages to be moved to a subsequent step of a workflow such as review for publishing or deployment).

Thus, to assess a web page using such web assessment platforms, a user usually has to generate actual web page content from the template or page design and go outside the design environment (e.g., the web editor) to submit the generated web page to the web assessment platform. Once the response is received from the web assessment platform (e.g., the score or the specification of any elements that failed the assessment criteria), the user then has to re-enter the design environment, attempt to locate the problematic elements of the web page in the design of that web page and make corrections in the design of the template or web page.

What is desired then, is a way to improve web content development. Specifically, what is desired are systems and methods to integrate the assessment of web page and templates into a web page editing environment including the automation of the correction of such web pages or templates based on such assessments.

To those ends, among others, attention is now directed to the embodiments of systems and methods for web content development disclosed herein. Specifically, embodiments as disclosed may provide a web editing environment integrated with a web assessment platform for auditing a web page under design in the context of the editing environment. A web editor can obtain a generated web page generated from a web page being designed in the web editor and submit the web page to a web assessment platform such as Google® Lighthouse or the like. Such an audit may, for example, be requested by a user through an interaction with the web editor or automatically instituted by the web editor based on the occurrence of an event.

For example, the audit may be performed in the context of an editing, publishing, or deployment. Thus, for instance, the web editor may allow a user to institute a portion or step of a workflow associated with the editing, publishing or deployment of a web page undergoing editing. For example, the web editor may present a button or menu option to institute a step of a workflow (e.g., a "publish" or "deploy" button). In this manner, the audit may be performed substantially automatically for every web page as part of a publish or deployment workflow instituted by an entity (e.g., an enterprise or the like) with respect to the editing, publishing or deployment of such web pages using the web editing environment.

The submission may request an audit for one or more areas of optimizations or criteria such as accessibility, search engine optimization, or performance. The web editor can receive an audit report including an audit score from the web assessment platform and present the web audit score for the criteria in the context of the editing of the web page in the web editor. In some cases, the web editor may not allow a step in a workflow (e.g., a next step in a workflow requested by a user such as publish or deploy) to proceed if the audit score returned from the web assessment platform is below a certain threshold (e.g., a threshold score associated with an area of optimization). Moreover, according to some embodiments the web editor may present the web audit report in the context of the web editor or may identify (e.g., present, highlight, etc.) web elements identified as failing by the web audit report in the context of the editing of the web page in the web editor.

To illustrate, in some cases an audit report may include an identification of an element identified as failing and a reason for the element failing. This identification can, for example, comprise a tag (e.g., an HTML tag associated with the failing element or an identification of the node (e.g., a path of the node) of the HTML or the Document Object Model (DOM) of the rendered HTML). The web editor can thus compare the identification of the failing element in the audit report with the HTML of the web page being edited (or a DOM of the HTML) to identify the failing element. This failing element can then be identified as failing in the context of the editing of the web page in the web editor such as by highlighting the failing element in a What-You-See-Is-What-You Get (WYSIWYG) (or other) type of presentation of the web page, or presenting the failing element in a portion of the interface of the editor.

To assist in identifying failing elements, in one embodiment, when HTML for a web page is generated for a web page being designed in the web editor, the web editor may insert element identifiers into the generated HTML in association with each of the elements of the generated HTML. These element identifiers may be random or generated algorithmically and may be unique for each element (e.g., may uniquely identify the element). They may, for example, be an identifier inserted into an HTML tag or other markup of the corresponding HTML element.

In this manner, if the audit report includes a portion of the HTML of a failing element that HTML included in the audit report for the failing element will include that identifying tag. Thus, the identifying tag for a failing element may be obtained from the portion of the audit report corresponding to the failing element, and the corresponding failing element identified in the generated HTML using that unique identifier.

In another embodiment, the web editor may identify the HTML node path for a failed element from the portion of the audit report corresponding to the failed element. The DOM of the generated HTML for the web page can then be traversed by the web editor to identify the HTML corresponding to that failed element.

In certain embodiments, the web editor may not only identify failing elements of the web page being edited in the web editor but may identify, or take, remedial action with respect to one or more of the identified failing elements of the web page undergoing editing in the editing environment.

Specifically, as audit reports may identify failing elements and a reason or title (used here interchangeably) for the element failing, a web editor may be configured with a mapping between reasons and one or more remedial actions (referred to the remedial action table). The web editor can thus iterate through each of the failing elements identified in the audit report received from the web assessment platform to extract the identification of an element and the reason for the element failing from the audit report. The reason can be used to index the remedial action table to determine if there is a corresponding remedial action associated with the action.

If there is a remedial action, this remedial action can be identified to a user by the web editor in association with the identification of the failing element in the context of the editing of the web page in the web editor. The user can then select to take (or not take) the recommended remedial action for the failing element. Alternatively, when a remedial action is determined for a reason corresponding to an element identified as failing in the audit report, the remedial action may be automatically taken by the web editor on the web page (e.g., by modifying the web page design according to the remedial action determined).

Figure 2:
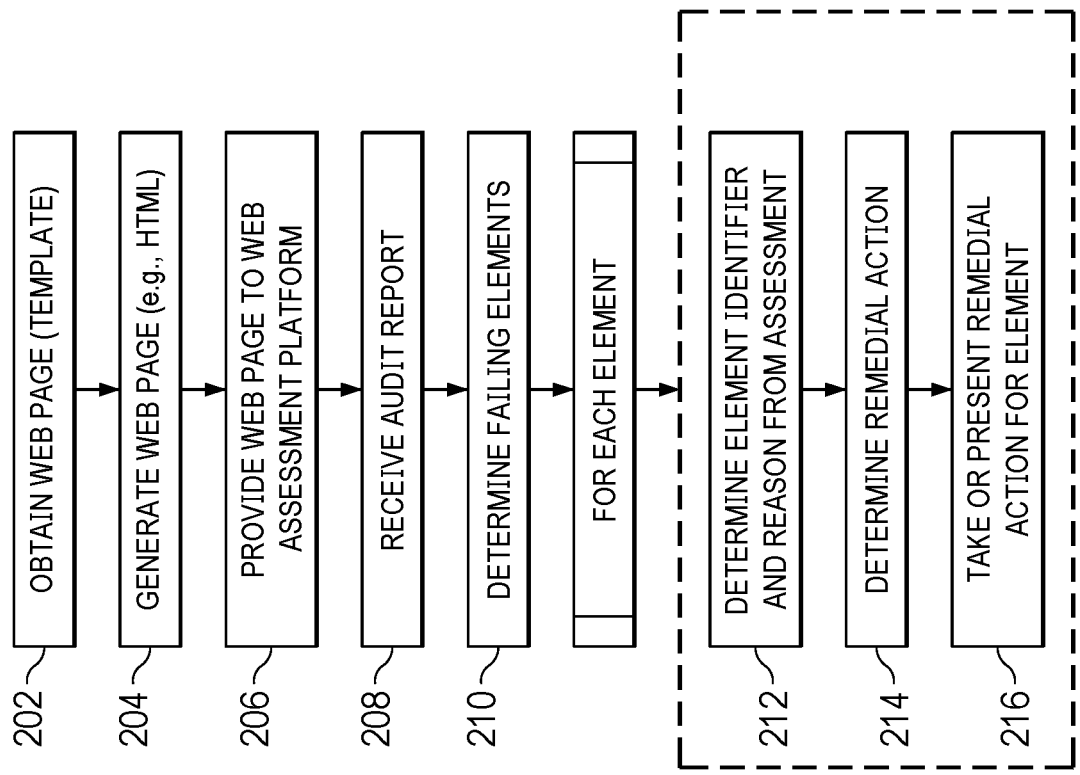
FIG. 2 is a flow diagram of an embodiment of a method for the assessment and remediation of web pages in the context of web content development.

FIG. 1 depicts an embodiment of an architecture that includes one embodiment of a web content development platform 100 coupled to one or more user devices 122 over network 130. FIG. 1 may be understood in association with FIG. 2, depicting a flow diagram of an embodiment of a method for the assessment and remediation of web pages in the context of web content development Web content development platform 100 may be part of, or include a web content management system. Network 130 may be the Internet, an intranet, a wireless or wired network, a LAN, a WAN, some combination of these types of networks, etc. Such a web content development platform 100 may be deployed internally within an enterprise on physical server computers (referred to sometimes as "hosted on-premise"), may be hosted externally to an enterprise, may be hosted on one or more virtual servers, or may be hosted or deployed in a cloud based computing platform.

The web content development platform 100 allows web content developers at devices 122 to compose, edit, review, publish or perform other tasks associated with the management, creation, editing, publishing or deployment of web content. In particular, according to certain embodiments the web content development platform 100 may allow these web content developers to define templates 172 that may be used to implement, or define content for, a website.

These templates 172 may be files (e.g., XML, JSON, etc.) or portions thereof, and associated metadata that define the content and appearance (e.g., the design) of at least a portion of the web site, such as a web page or the like. For example, in one embodiment, a template 172 is associated with content and appearance. The template 172 may be an XML document or portion (e.g., fragment or portion of an XML document) that has sections or tags that define the content (e.g., the actual content to be rendered for the component) and appearance of that template 172, or reference one or more external (to the template 172) sources or locations where the content or appearance definition may be located.

The pages authored through the web content development platform 100 can be deployed to a live web site through the use of a runtime engine or appropriate web server or the like. The pages generated from templates 172 may, for example, be rendered dynamically by a runtime engine. If the web site or portions thereof are static, web pages (e.g., HTML or the like) may be generated from the templates 172 and these generated web pages deployed into the runtime environment of a web site.

Web content development platform 100 may thus provide a variety of interfaces or avenues by which a web content developer can generate, or perform other actions associated with, templates 172. Specifically, the web content development platform 100 may provide a browser based web content editor 102 (and a corresponding editor interface 104).

The editor 102 may be a browser based editor capable of rendering and operating in a browser 124 such as those known in the art. In one embodiment, the editor 102 may be written in HTML and JavaScript® (e.g., jQuery) such that it may be rendered by a browser 124 and utilize JavaScript® (e.g., jQuery) to query q Document Object Model (DOM) associated with content rendered by the browser 124 at a device 122. Other implementations of editor 102 are possible and are fully contemplated here. For example, while jQuery is a well-known cross-platform JavaScript® library, and thus may be conveniently utilized in certain embodiments, other embodiments may utilize other types of libraries or code, whether JavaScript® or otherwise, to equal efficacy.

The editor 102 may be downloaded by a user at device 122 and executed or rendered in the browser 124. For example, the user may access the web content development platform 100 through his browser 124 (e.g., at a particular URL). When the user is presented with an interface by the web content development platform 100 the user may be presented with the opportunity to select the editor 102 at which point the editor 102 is sent to the user's browser 124 where it is rendered or executed (used interchangeably herein in this context when referring to a browser) by the browser 124.

When the editor 102 is executed in the browser 124 it may provide an interface in the browser 124 through which a user may create and edit templates 172 (which may be saved or stored at the web content development platform 100). As the user interacts with the editor 102 to design templates 172 the editor 102 may be adapted for auditing the web page (i.e., the design of such a web page as expressed by template 172) under design in the editor 102.

Specifically, as a user is editing template 172 (which may specify the design of a web page, multiple web pages, or a component or portion less than an entire web page) in editor 102, an audit may be performed on the web page under design in the editor 102. It will be understood that though a web page will be used as an example of the content under design and being audited in discussion of embodiments herein, such descriptions and discussions will apply more generally to the auditing of any content in association with development of that content, whether that content is a web page, less than an entire web page or more than an entire web page.

In any case, an audit of a web page under design may, for example, be requested by a user through an interaction with the web editor 102 or automatically instituted by the web editor 102 based on the occurrence of an event. For example, an audit may be instituted as part of an editing, publish, or deploy workflow, as part of the saving of template 172 for the web page being designed at web content development platform 100, or in association with another event.

Thus, for instance, the web editor 102 may allow a user to request an audit through an interaction with a portion of an interface of the web editor 102 associated with such audits (e.g., a button, window, tab, etc. of the web editor 102 associated with audits). In another instance, the web editor 102 may allow a user to institute a portion or step of a workflow associated with the editing, publishing, or deployment of a (template 172 for a) web page undergoing editing. For example, the web editor 102 may present a button or menu option to institute a step of a workflow (e.g., a "publish" or "deploy" button). In this manner, the audit may be performed substantially automatically for every web page as part of a publish or deployment workflow instituted by an entity (e.g., an enterprise or the like) with respect to the editing, publishing or deployment of such web pages using the web editing environment.

A web editor 102 can obtain a generated web page 174 generated from the template 172 for the web page being designed in the web editor 102 and submit the web page to a web assessment platform 180 such as Google® Lighthouse or the like in a request for an audit (STEPS 202, 204 and 206 of FIG. 2). It will be noted here that while web assessment platform 180 is depicted as a separate entity from web content development platform 100, in other embodiments web assessment platform 180 may be implemented as a library or other code or set of instructions implemented in association with web content development platform 100 (e.g., incorporated into web editor 102, as a service provided by web content development platform 100, or otherwise provided by, or implemented in association with, web editor 102 or web content development platform 100 by providers of web content development platform 100).

The generated web page 174 may comprise the HTML or other content specified by the template 172 and may be generated by the web editor 102 based on the template 172. In one embodiment, the web editor 102 can make a duplicate of the web page 174 or template 172 before (or after or during) the requesting of an audit from the web page assessment platform 180 such that any operations or modifications done in association with the auditing of the web page 172 can be accomplished with respect to this duplicate.

The request to the web assessment platform 180 may request an audit for one or more areas of optimizations or other criteria such as accessibility, search engine optimization, or performance. The web assessment platform 180 can perform such an audit and return an audit report in response to the request, where the audit report may include an audit score for the submitted web page with respect to the specified area of optimization along with an identification of failing elements (with respect to the area of optimization) of the submitted web page.

The web editor 102 can receive an audit report having audit data from the web assessment platform 180. The audit data can include an audit score for the criteria (e.g., the specified area of optimization) wherein the audit score for the criteria can be presented by the web editor 102 in the context of the editing of the web page in the web editor 102 (STEP 208 of FIG. 2). In some cases, the web editor 102 may not allow a step in a workflow (e.g., a next step in a workflow requested by a user such as publish or deploy) to proceed if the audit score returned from the web assessment platform 180 is below a certain threshold (e.g., a threshold score associated with an area of optimization). Moreover, according to some embodiments the web editor 102 may present audit data from the web audit report in the context of the interface of the web editor 102 or may identify (e.g., present, highlight, etc.) web elements identified as failing by the audit report in the context of the editing of the template 172 for the web page in the web editor 102.

To illustrate, in some cases the audit data of the audit report may include an identification of an element identified as failing and a reason for the element failing. This identification can, for example, comprise a tag (e.g., an HTML tag associated with the failing element or an identification of the node (e.g., a path of the node) of the HTML or the Document Object Model (DOM) 176 of the rendered HTML). The web editor 102 can thus compare the identification of the failing element in the audit report with the content (e.g., HTML) 174 of the web page being edited (or a DOM 176 of the content 174) to identify the failing element (STEP 210 of FIG. 2). This failing element can then be identified as failing in the context of the editing of the web page in the web editor 102 such as by highlighting the failing element (e.g., in a WYSIWYG or other type of presentation of the web page), or presenting the failing element in a portion of the interface of the editor 102.

To assist in identifying failing elements, in one embodiment, when content (e.g., HTML) 174 for the web page associated with the template 172 being designed in editor 102 is generated, the web editor 102 may insert element identifiers into the generated content (e.g., HTML) 174 in association with each of the elements of the generated content 174. These element identifiers may be random or generated algorithmically and may be unique for each element (e.g., may uniquely identify the element). They may, for example, be an identifier inserted into an HTML tag or other markup of the corresponding HTML element.

In this manner, if the audit report includes a portion of the HTML of a failing element that HTML included in the audit report for the failing element will include that identifying tag. Thus, the identifying tag for a failing element may be obtained from the portion of the audit report corresponding to the failing element, and the corresponding failing element identified in the generated HTML using that unique identifier.

In another embodiment, the web editor 102 may identify the HTML node path for a failed element from the portion of the audit report corresponding to the failed element. The DOM 176 of the generated content 174 for the web page can then be traversed by the web editor to identify the HTML corresponding to that failed element based on the node path of that failing element included in the audit report received from the web assessment platform 180.

In certain embodiments, the web editor 102 may not only identify failing element of the web page being editing in the web editor 102 (e.g., the template 172 for such a web page) but may identify, or take, remedial action with respect to one or more of the identified failing elements in the template 172 for the web page undergoing editing in the editing environment.

Specifically, as audit reports may identify failing elements and a reason or title (used here interchangeably) for the failing element, a web editor 102 may be configured with a mapping between reasons (e.g., that may be included in an audit report) and one or more remedial actions (referred to the remedial action table 178). The web editor can thus iterate through each of the failing elements identified in the audit report received from the web assessment platform 180 to extract the identification of an element and the reason for the element failing from the audit report (STEP 212 of FIG. 2). The reason can be used to index the remedial action table 178 to determine if there is a corresponding remedial action associated with the action (STEP 214 of FIG. 2).

If there is a remedial action, this remedial action can be identified to a user by the web editor 102 in association with the identification of the failing element in the context of the editing of the web page in the web editor (STEP 216 of FIG. 2). The user can then select to take (or not take) the recommended remedial action for the failing element. Alternatively, when a remedial action is determined for a reason corresponding to an element identified as failing in the audit report, the remedial action may be automatically taken by the web editor 102 on the web page (e.g., by modifying the template 172 according to the remedial action determined) (STEP 216 of FIG. 2).

It may now be useful to illustrate an example of the automated assessment and remediation of designs of web pages in the design environment. FIGS. 3A-3L are block diagrams illustrating the assessment and remediation of web pages in the context of web content development. IN particular, FIGS. 3A-3L depict examples of the automated assessment and remediation of web pages in the context of the design of a web page in a web editor with respect to an accessibility audit where "alternative text" has not been provided with respect to an image included in the web page design, an accessibility issue.

Figure 3A:
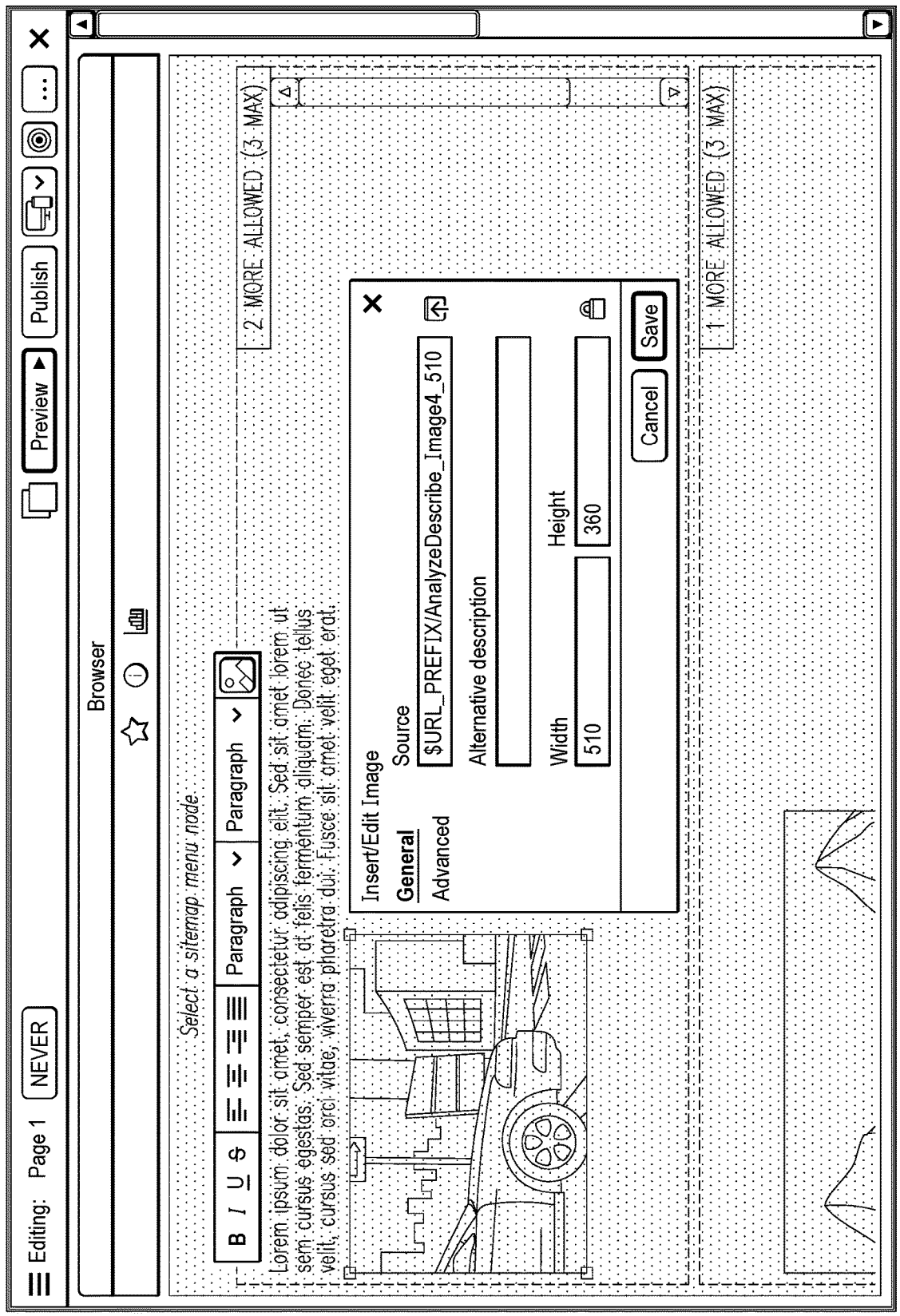
FIGS. 3A-3Q are block diagrams illustrating the assessment and remediation of web pages in the context of web content development.

Referring first to FIG. 3A, an interface for a web editor is presented where a user is designing a web page by inserting an image into the web page. The web editor presents an interface to insert and describe the image included in the web page, however in this example the user has not entered any such alternative text. Again, this is an accessibility issue.

Figure 3B:
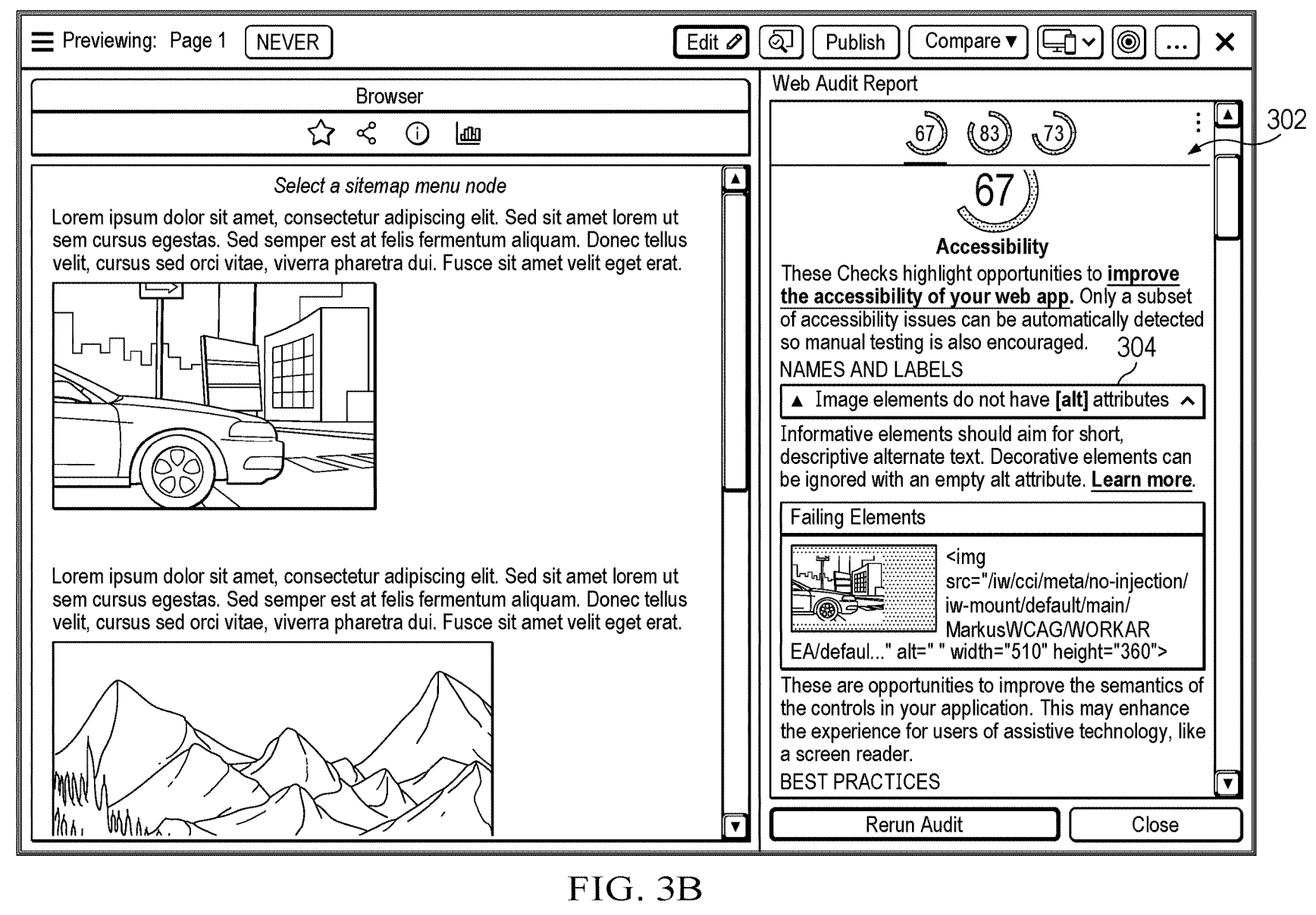

Turning to FIG. 3B, thus, when the web page under design is audited for accessibility (e.g., provided to a web assessment platform in a request for an accessibility audit), an audit score may be returned along with an identification of a failing element. The interface for the web editor can thus present an area 302 for presenting the accessibility score along with an area 304 identifying the failing element along with a reason the identified element failed (or other is otherwise problematic).

Figure 3C:
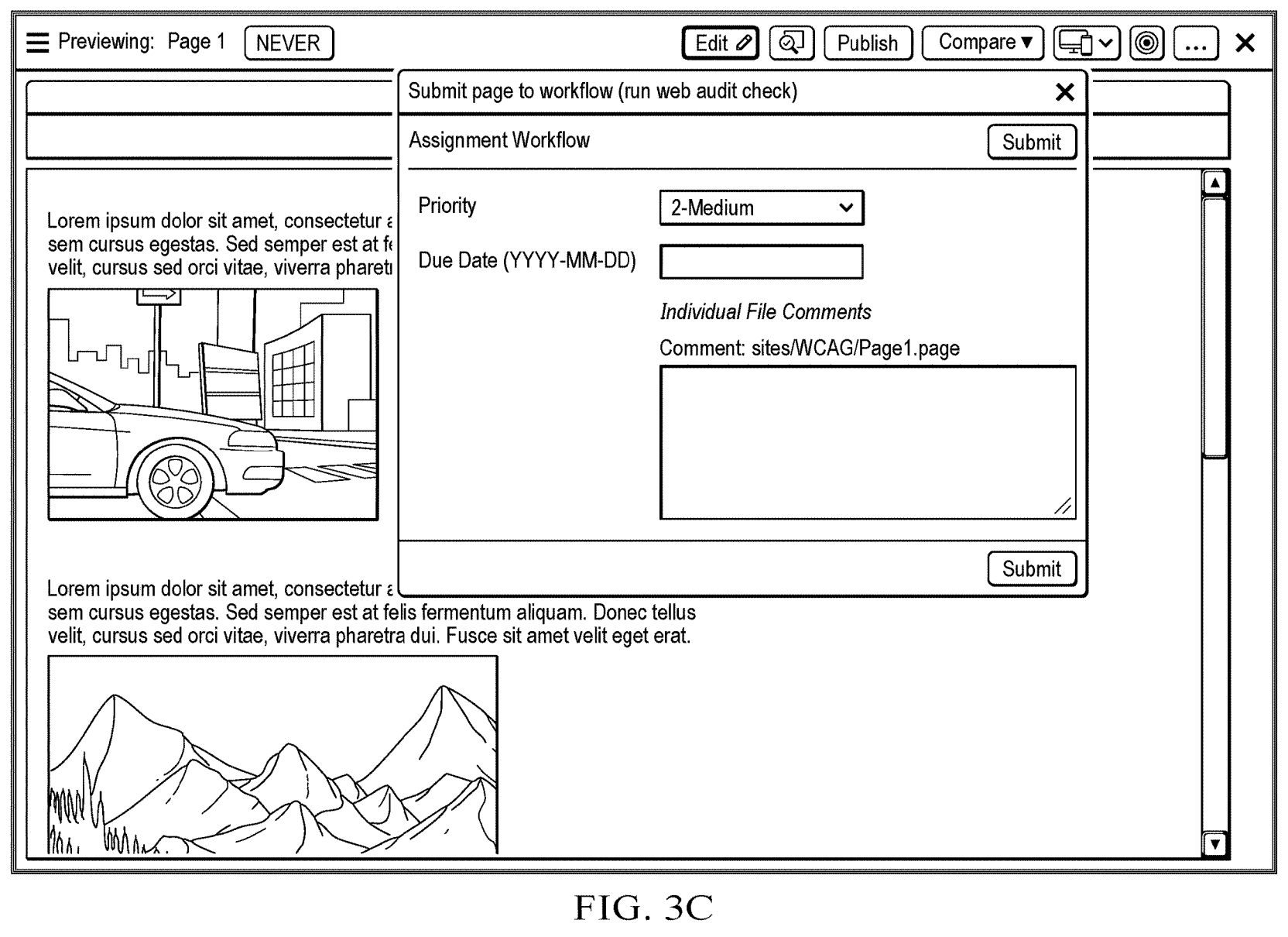

This audit may have, for example, been run as part of the publication or deployment of the web page under design in the web editor, such as when a user selects the "publish" button in the interface. FIG. 3C depicts an example of an interface that may be presented by a web editor when running the audit as part of a workflow involving the web page under design in a web editor.

Figure 3D:
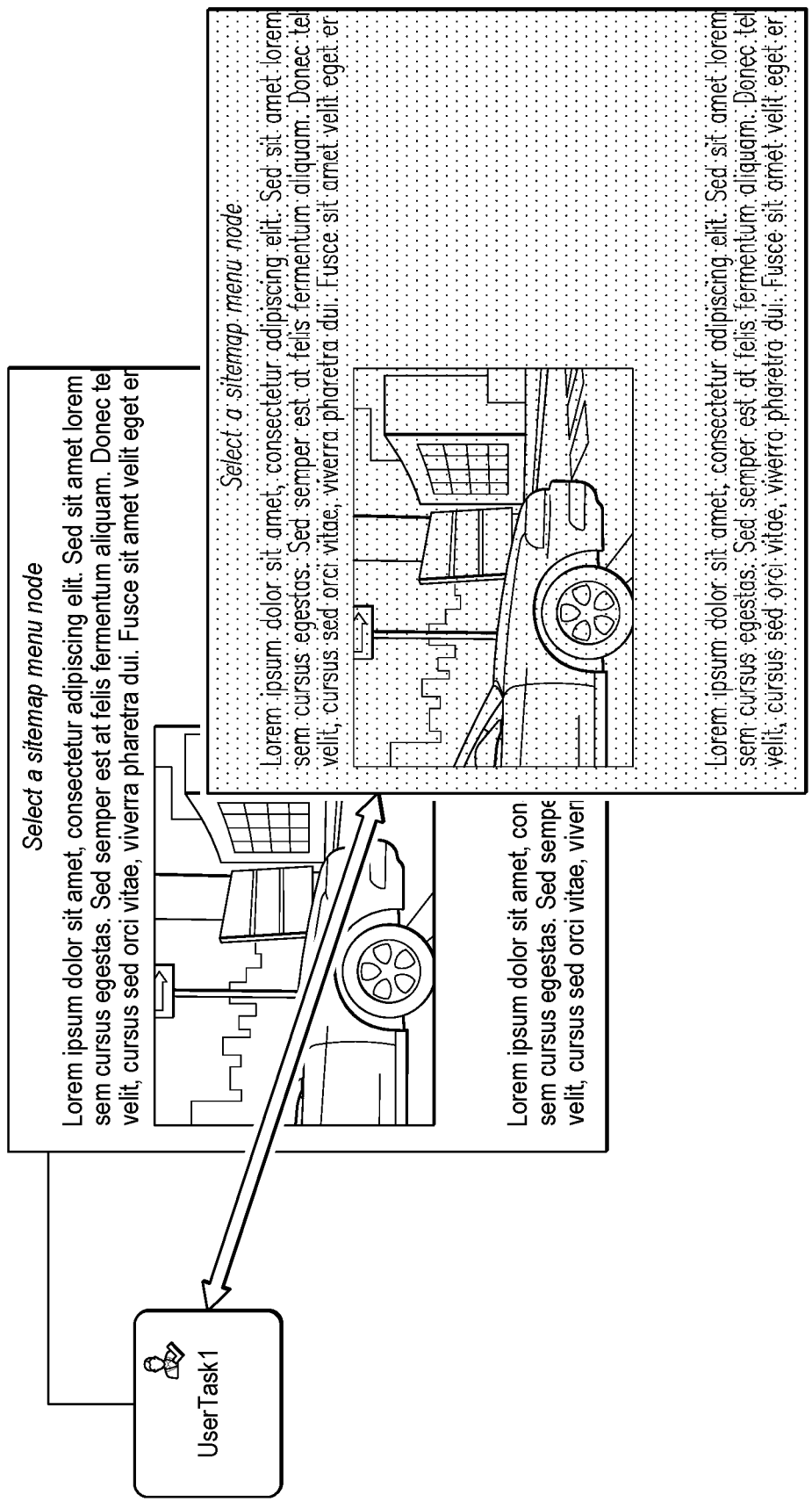

As illustrated in FIG. 3D, is a block diagram depicting that, in one embodiment, a web editor can make a duplicate of the web page before the requesting of an audit from a web page assessment platform such that any operations or modifications done in association with the auditing of the web page can be accomplished with respect to this duplicate.

Figure 3E:
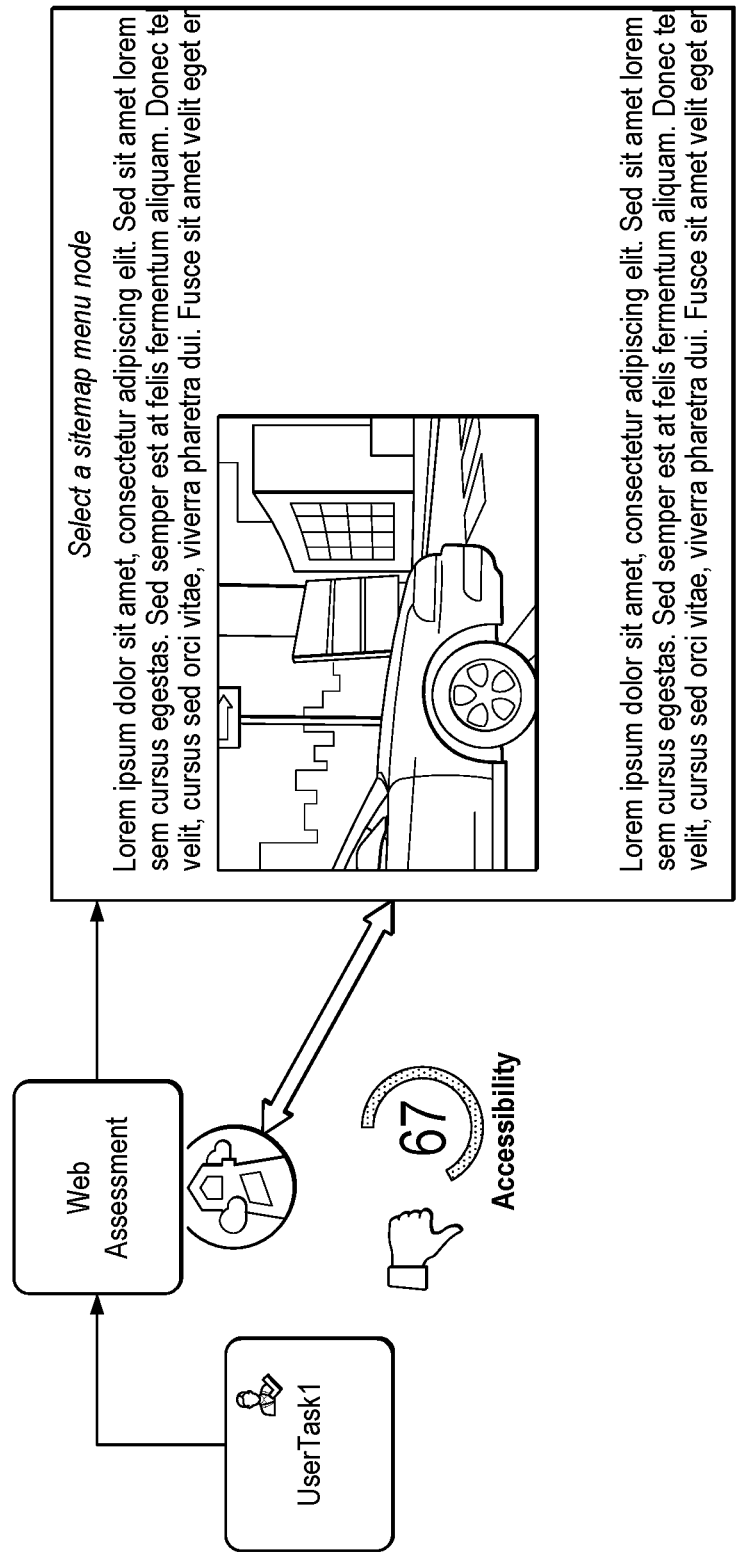

FIG. 3E is a block diagram depicting the submission of the web page (e.g., the content, including HTML) to a web assessment such as Google® Lighthouse or the like in a request for an audit. This request to the web assessment platform may thus be done automatically (e.g., without any further user involvement) in the course of a workflow including the editing of a web page in the web editor.

Figure 3F:
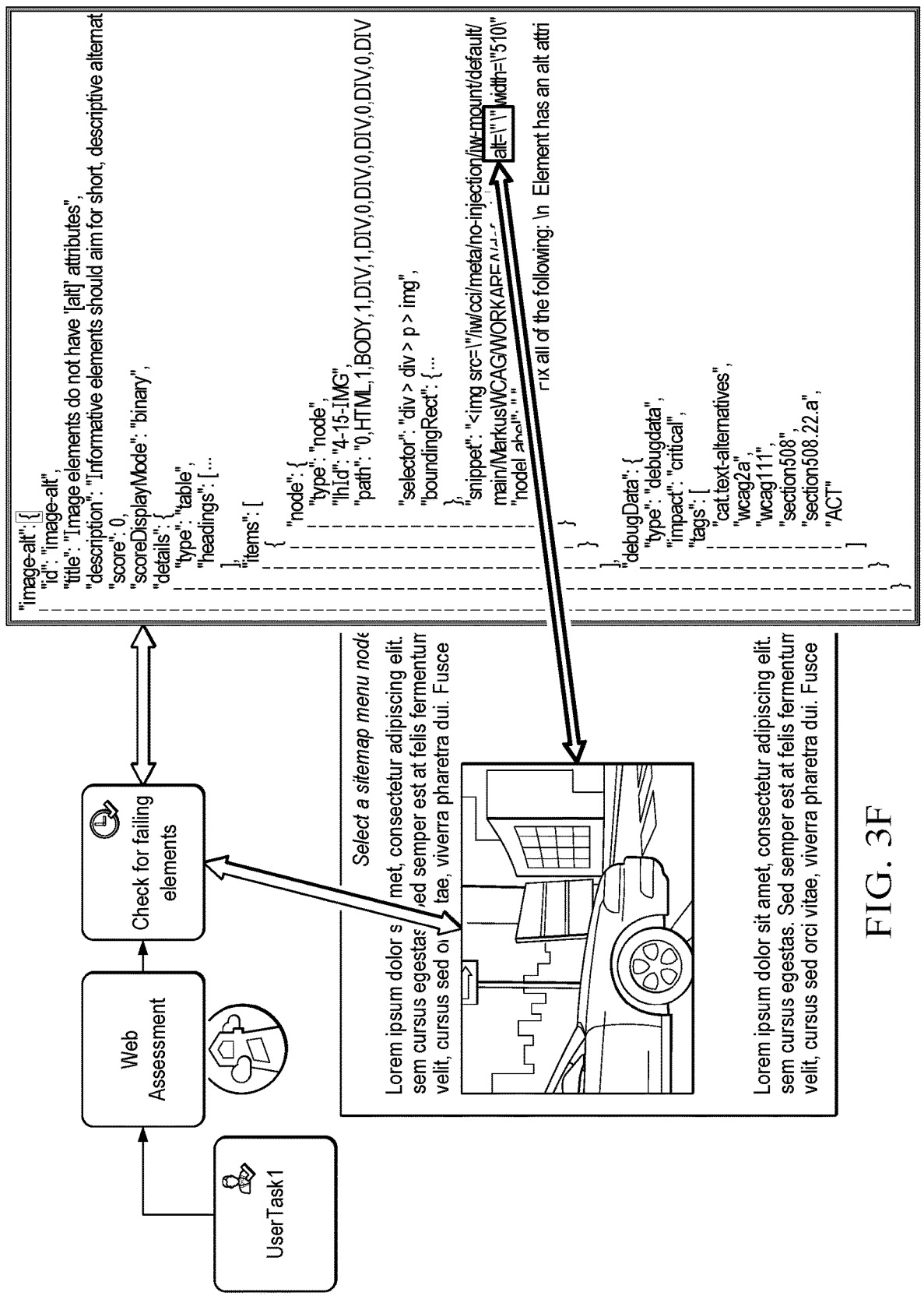

The web editor can receive an audit report including an audit score, an identification of the element identified as failing and a reason for the element failing from the web assessment platform. FIG. 3F depicts the reception of an audit report (where FIG. 3G depicts a larger version of that example of the audit report) and the iterating through the failing elements identified in the audit report to identify the corresponding failed element in the web page being edited in the editor.

AS can be seen in FIG. 3G, the identification for a failing element in the audit report may include a node path 312 for the failing element, a portion 314 (e.g., some or all) of the HTML of the failing element and a reason 316 the element failed the audit. Thus, the web editor 102 can compare the identification of the failing element in the audit report with the content (e.g., HTML) 174 of the web page being edited (or a DOM of the generated page) to identify the failing element.

Figure 3H:
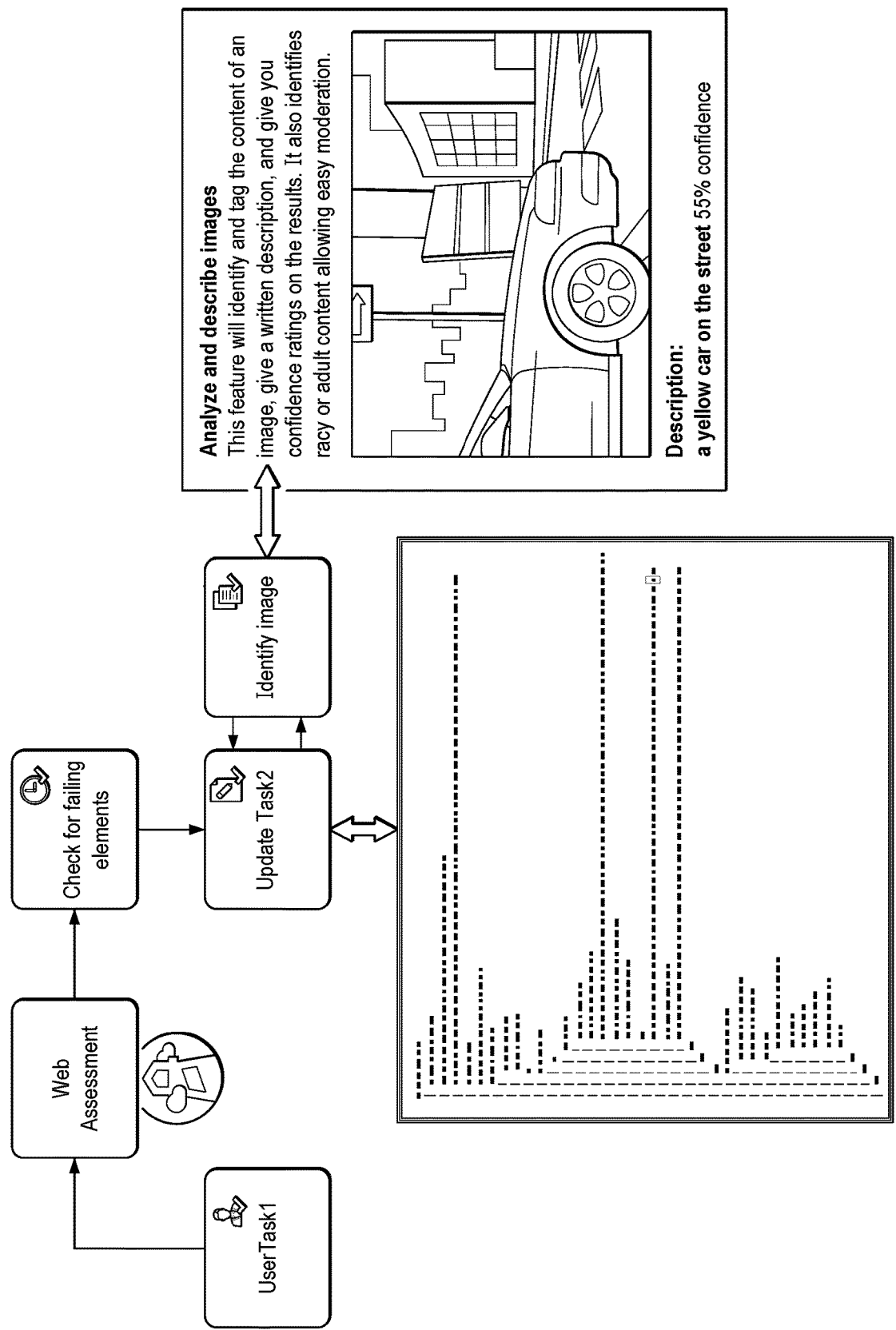

As FIG. 3H depicts, the failing element can thus be identified and a remedial action taken based on the reason identified for the failing element. Specifically, the reason 316 for the failing element (in this example "Fix all of the following: . . . ") may be used to search a mapping between reasons and one or more remedial actions to identify a remedial action. One such remedial action may be to invoke another application. Here, for example, as the image is missing the "alternative text" a remedial action is to run image analysis (e.g., a Rich Media Analysis) on the identified element (image) to obtain description (e.g., "a yellow car on the street") from such image analysis, and put the description into alt text of that element in the page design being edited in the web editor.

Figure 3I:
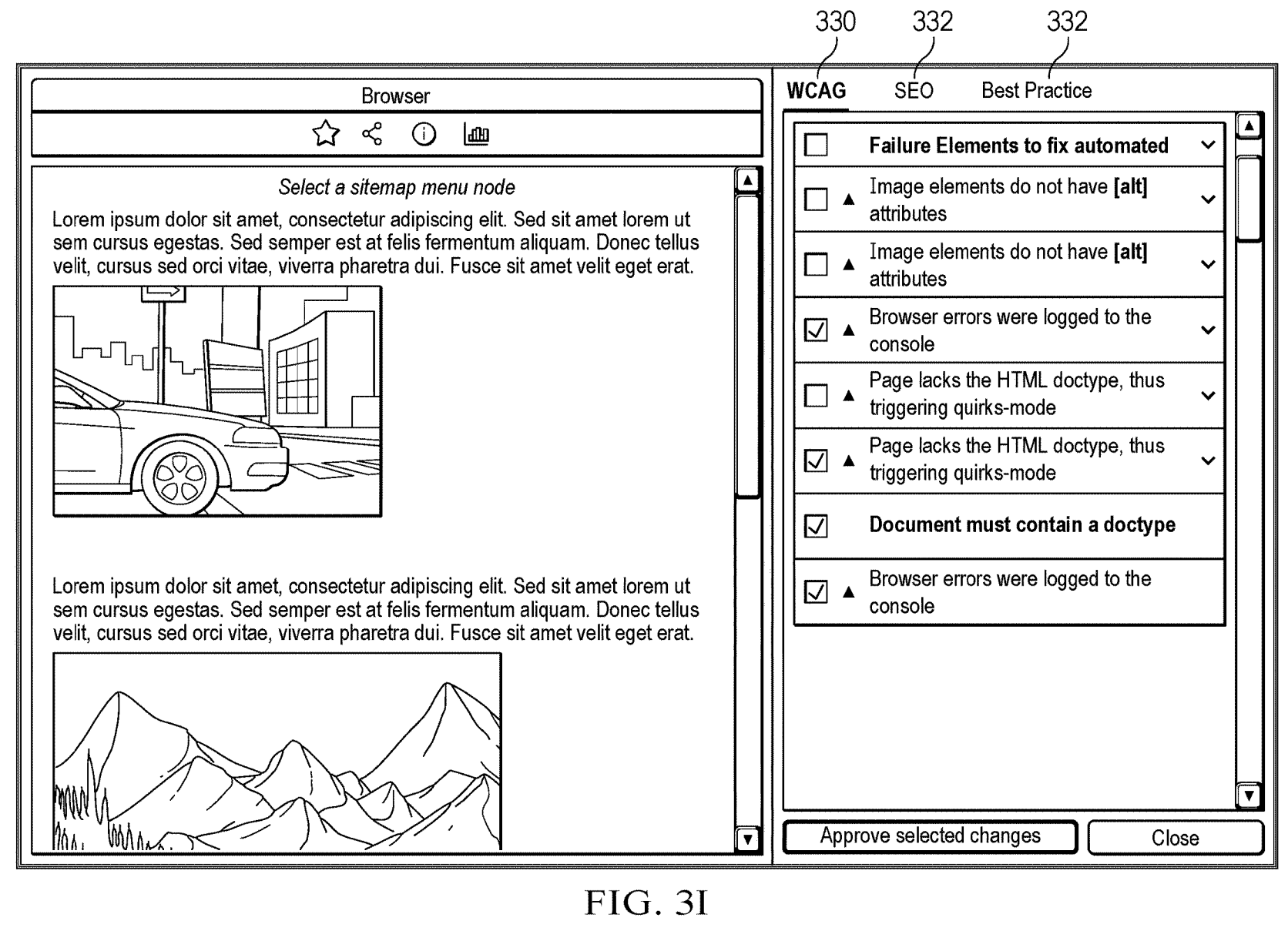
Figure 3J:
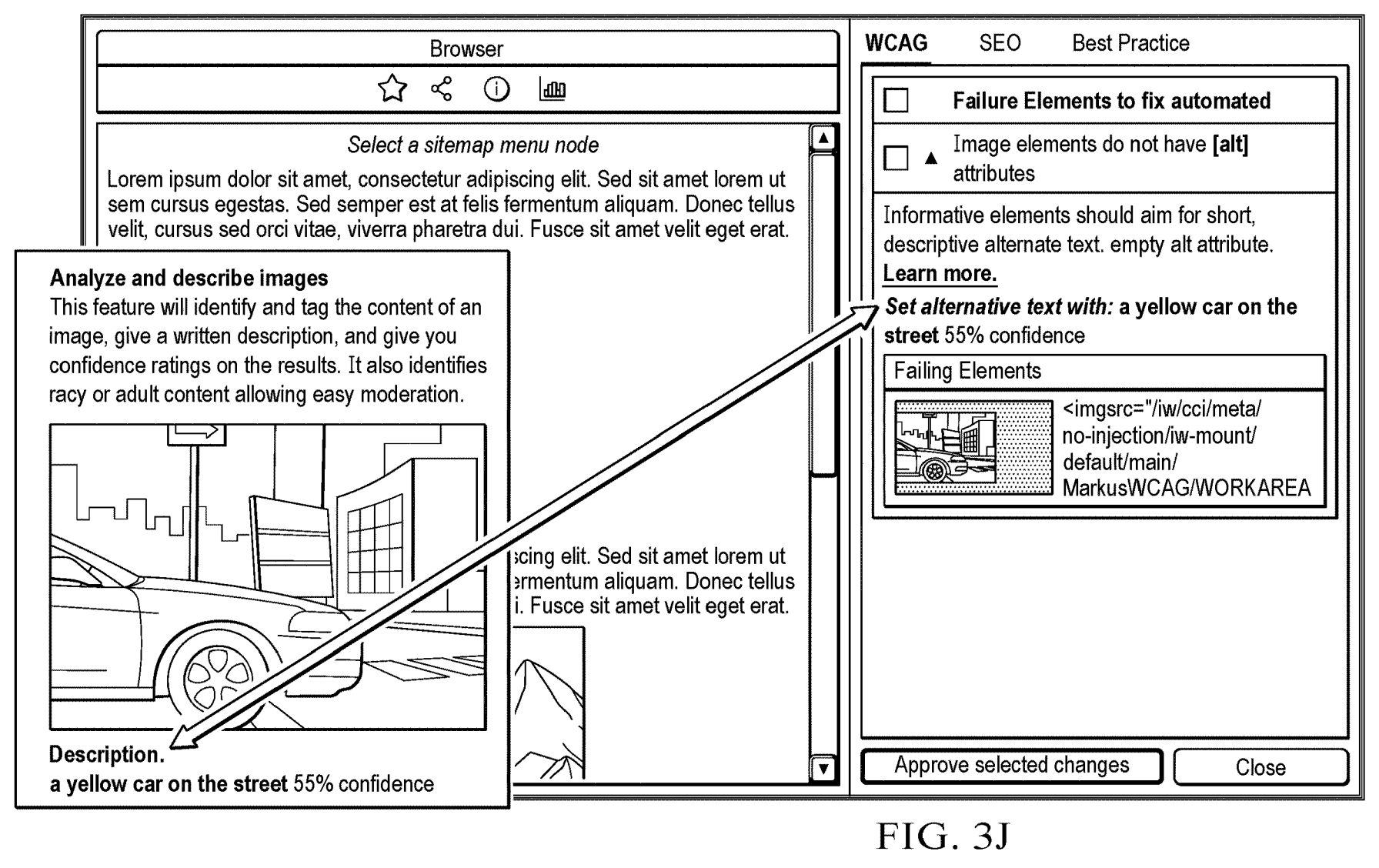

If there is a remedial action, this remedial action can be identified to a user by the web editor in association with the identification of the failing element in the context of the editing of the web page in the web editor to allow a user to select to take (or not take) the recommended remedial action for the failing element. FIG. 3I depicts one example of such an interface for a web editor presenting a set of potential remedial actions to take for the web page being edited in area 330 of the interface along with a button allowing a user to select remedial actions to perform. Notice here that other remedial actions 332 for other areas of optimization may also be presented in the same interface. FIG. 3J is a depiction of the inclusion of the text returned by the image analysis application as applied to the failing element in the "alternative text" of the identified failing element in the web page under design in the web editor, including notifying the user of the remedial action taken with respect to the element.

Figure 3K:
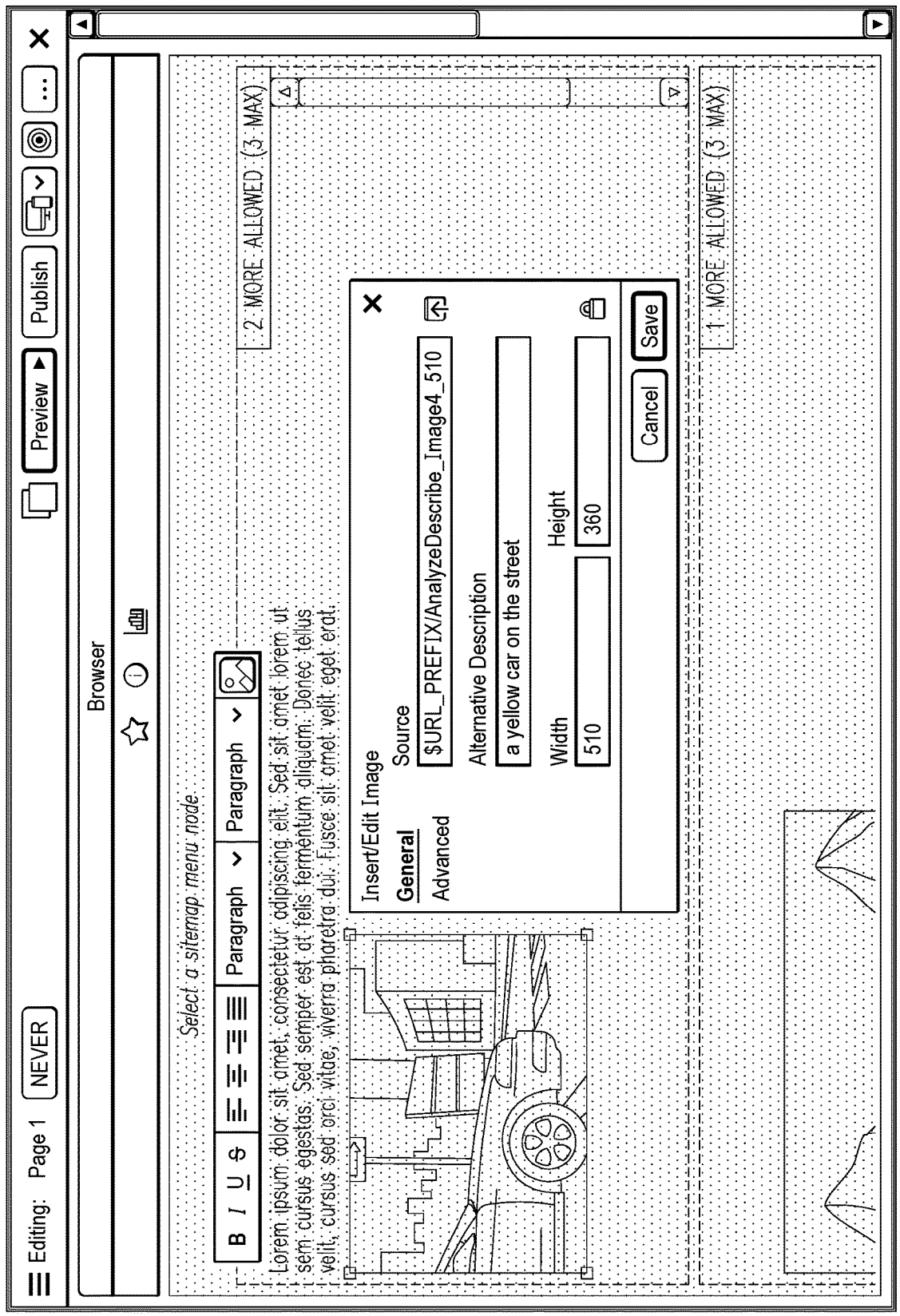

FIG. 3K shows the result of the performing of the remedial action, including that the "alternative text" for that image element has been set to the result of the image analysis performed on the image (e.g., a yellow car on the street").

Figure 3L:
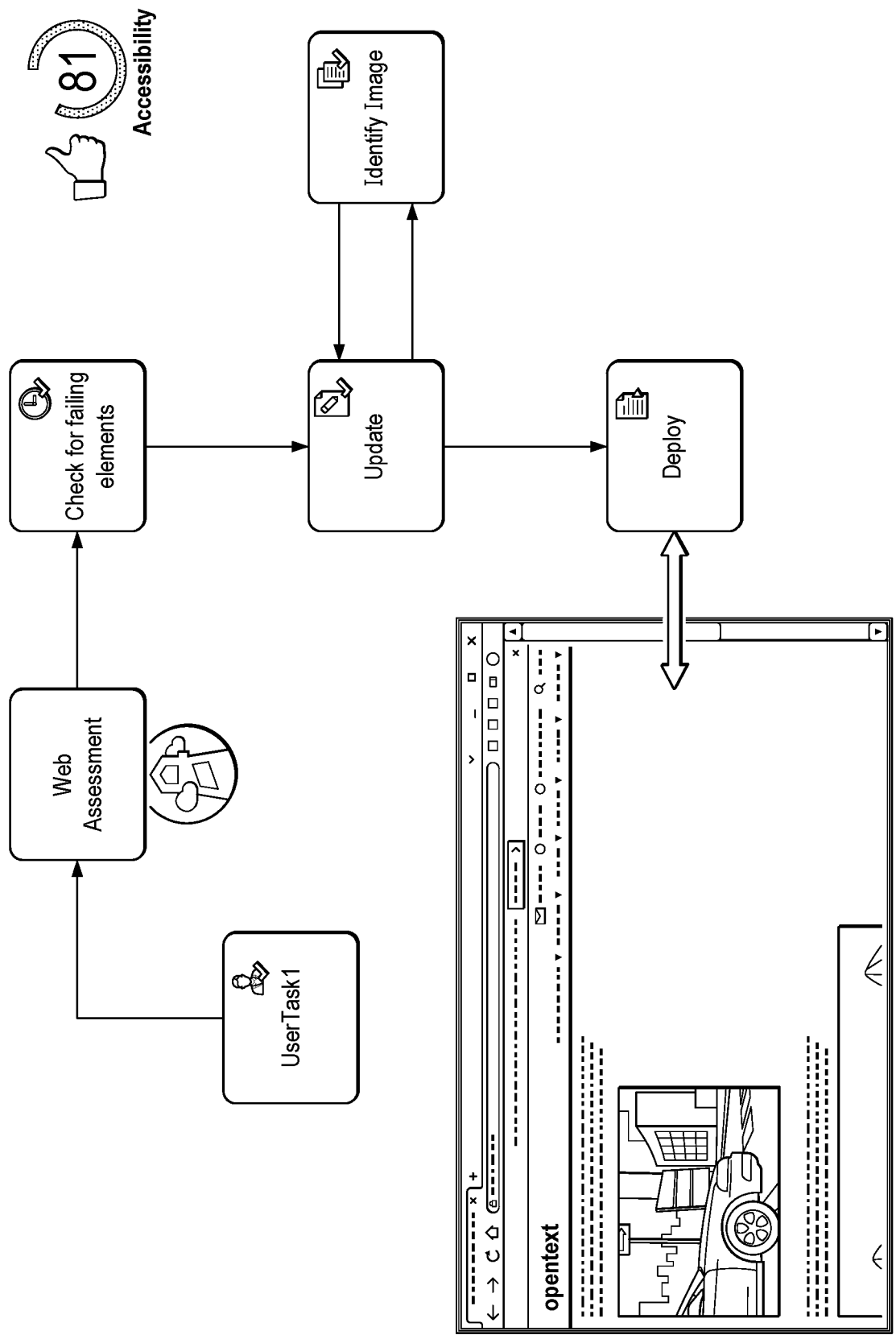

As noted above, in some embodiments, a web editor may not allow a step in a workflow (e.g., a next step in a workflow requested by a user such as publish or deploy) to proceed if the audit score returned from the web assessment platform is below a certain threshold (e.g., a threshold score associated with an area of optimization). Thus, once a remedial action for a failing element (or multiple failing elements) is taken by the web editor, a subsequent audit of the web page may be conducted by the web editor. At this point if the audit score for the area of optimization (e.g., accessibility) is above the threshold the web editor may not allow the step in the workflow to take place. FIG. 3L graphically depicts this (re)auditing of the web page and determination that the audit score for accessibility now passes the threshold and the next step in the workflow is taken (e.g., in this example a "deploy" step of a workflow).

Figure 3M:
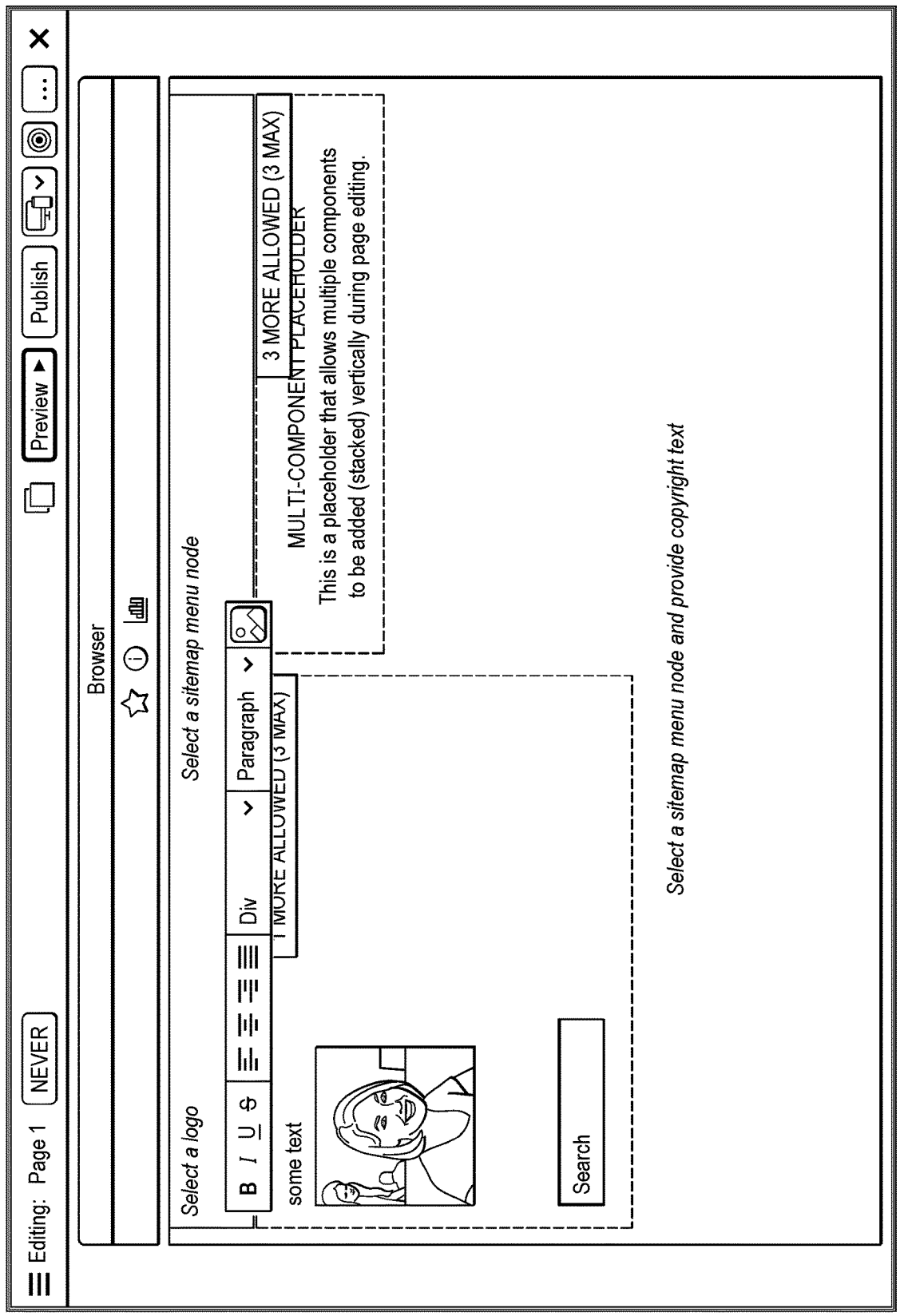
Figure 3N:
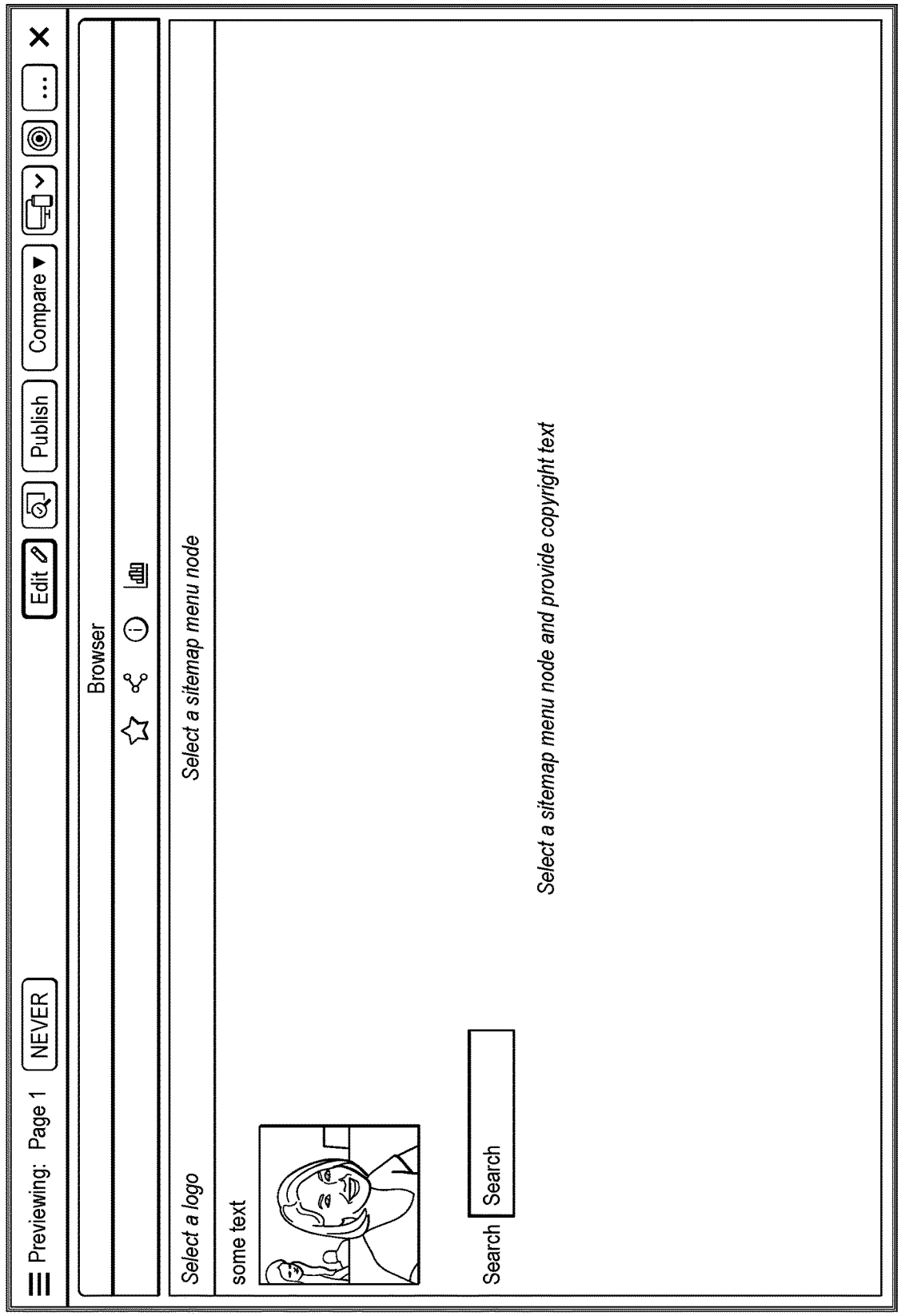
Figure 3O:
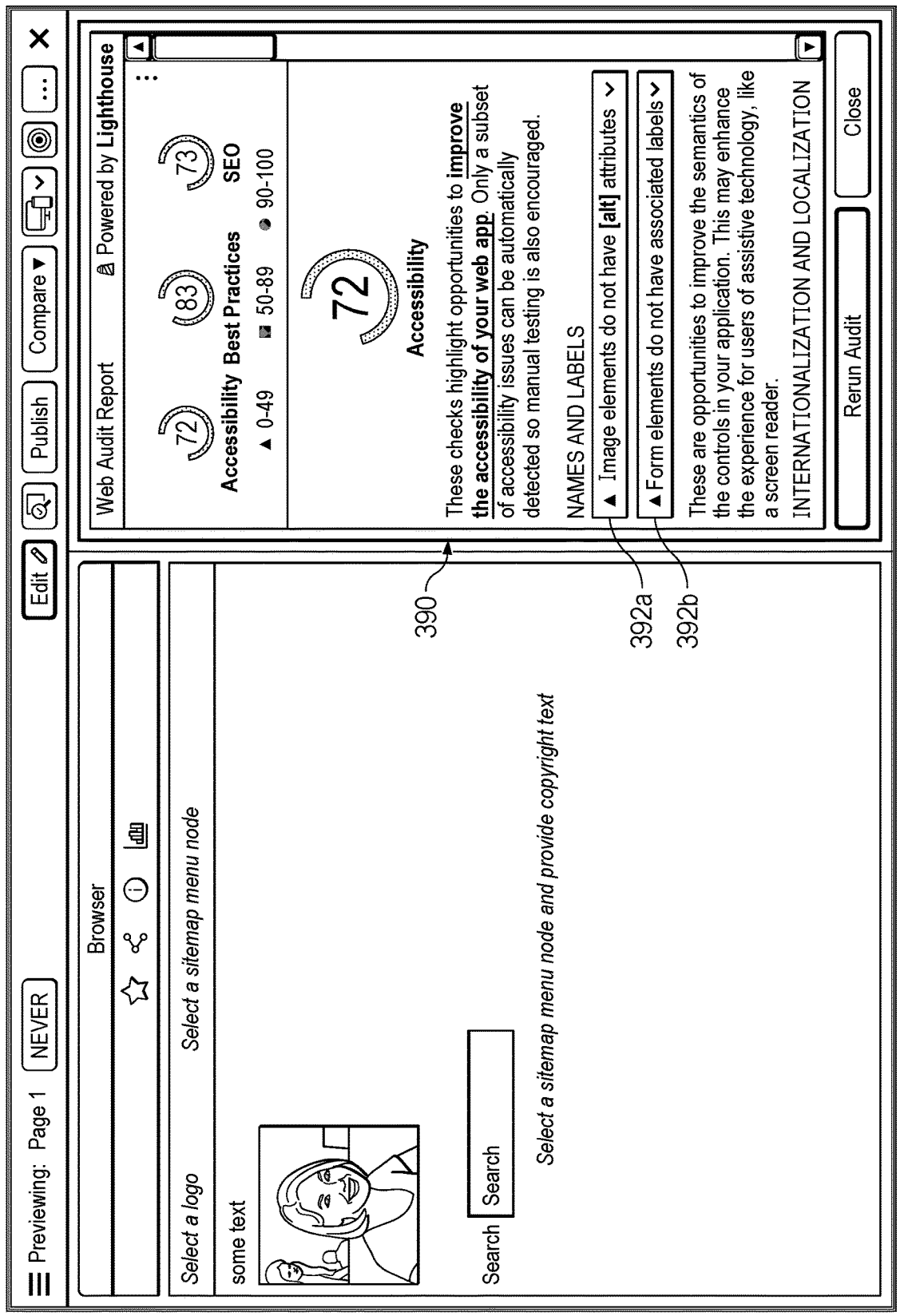

FIGS. 3M-3Q depict other examples of the automated assessment and identification of issues for web pages in the context of the design of that web page in a web editor. Specifically, FIG. 3M depicts one example of the editing of a web page in web editor, while FIG. 3N depicts a "preview" function of the web editor allowing a user (e.g., web page designer) to view the web page under design as it appears when rendered by a browser (e.g., without any of the web editing functions or overlays). FIG. 3O depicts an example of an interface of a web editor comprising a portion 390 presenting the results of a web audit, including one or more audit scores 394 for different areas of optimization. The results or detail for each area of optimization (e.g., accessibility) may be presented in the portion 390 of the interface as the user interacts or selects that area of optimization. For instance, in the example presented the details of the accessibility area of optimization are presented. These details may comprise identification 392 of individual issues that affected the score for that area of optimization. The portion 390 of the web editor interface may also allow interaction with identification 392 of individual issues to obtain more details on such issues.

Figure 3P:
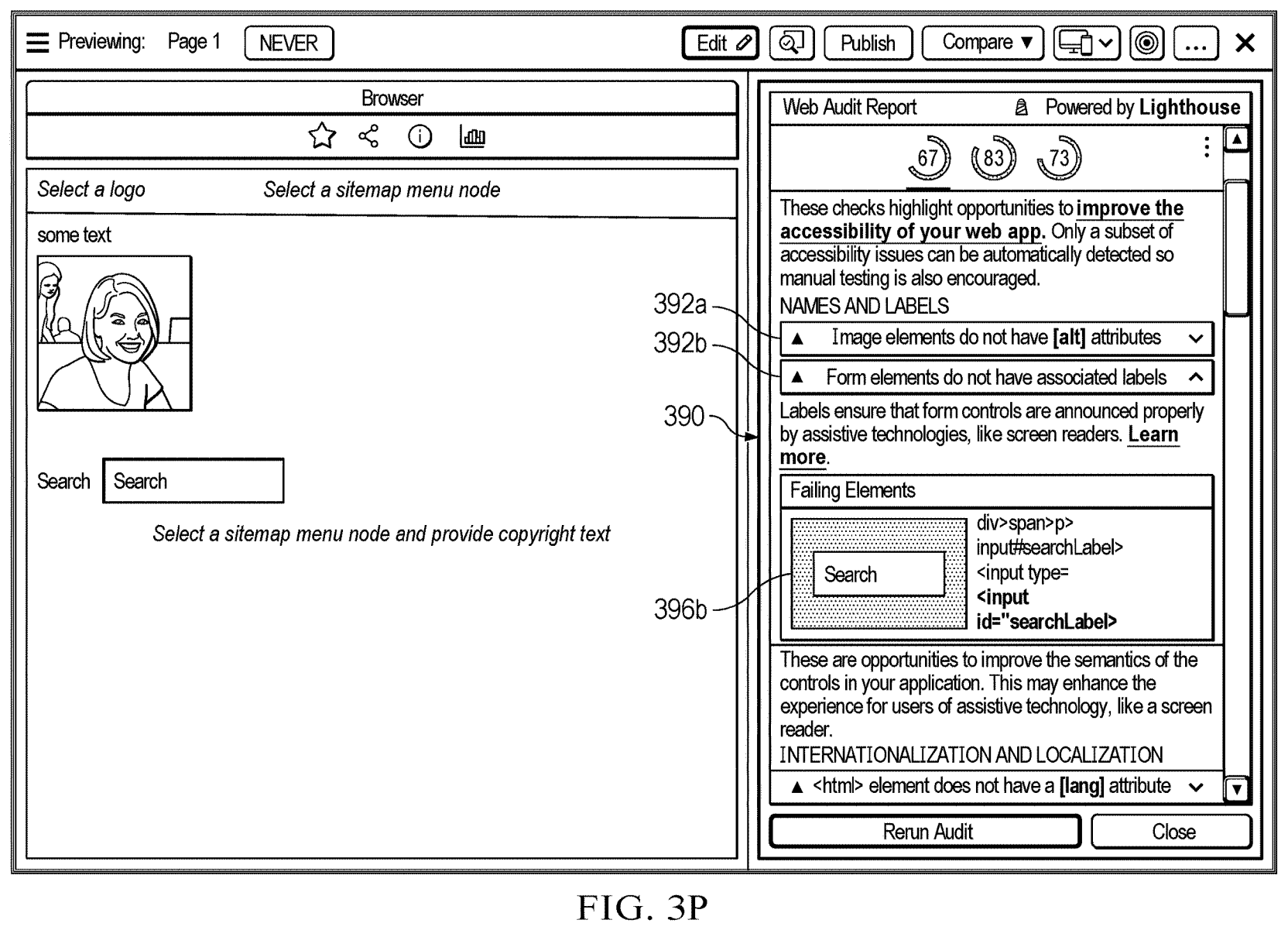
Figure 3Q:
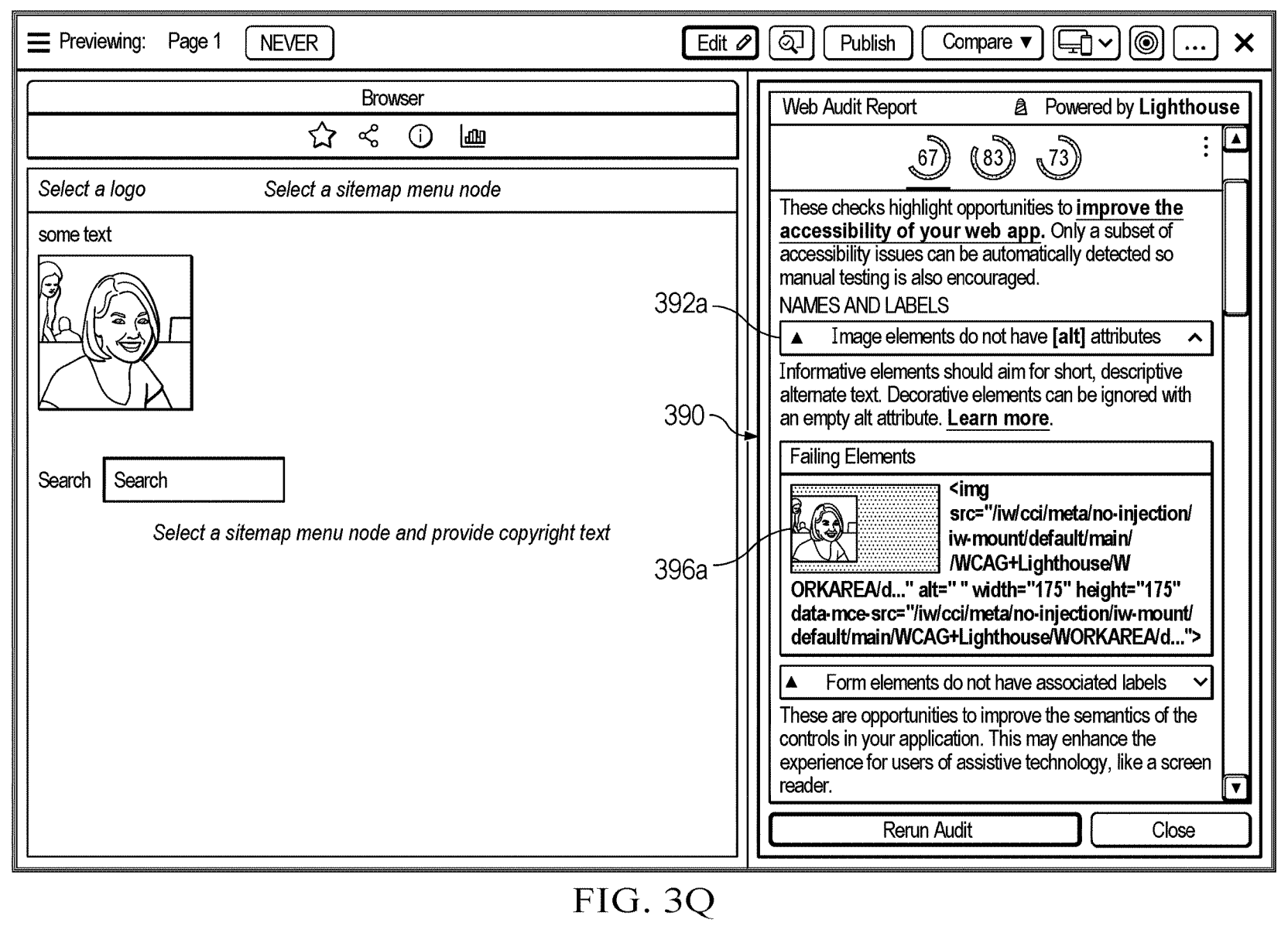

FIG. 3P depicts an example interface when the user has interacted with identification 392b of a first issue affecting the accessibility score. When more details of this issue are presented, the failing element 396b (e.g., an identification of the element and the problem with that element) may be presented in portion 390 of the interface for presenting results of the audit. Similarly, FIG. 3Q depicts an example interface when the user has interacted with identification 392a of a second issue affecting the accessibility score and the identification 396a of the failing element.

Those skilled in the relevant art will appreciate that embodiments can be implemented or practiced with other computer system configurations, including without limitation multi-processor systems, network devices, mini-computers, mainframe computers, data processors, and the like. The invention can be embodied in special purpose computers or data processors that are specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. For example, it will be understood that while embodiments as discussed herein are presented in the context of a browser based application other embodiments may be applied with equal efficacy to other types of components on computing devices (e.g., other native components, etc.).

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java®, JavaScript®, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such a computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A method of assessing a web page in a context of a web editor, comprising:
 receiving an indication for an audit of a web page from a web editor, wherein the web page is being edited in an interface of the web editor that displays a design representation of the web page, wherein the audit is against one or more predefined web page criteria relating to usability of the web page;

generating, by the web editor and from the design representation displayed in the interface, an instance of the web page specifically for the audit;

submitting, by the web editor, the instance of the web page to a web assessment platform for the audit against the one or more predefined web page criteria;

receiving, at the web editor, an audit report associated with the instance of the web page, the audit report including audit data identifying one or more failing design elements of the web page corresponding to the design representation, wherein the failing design elements do not meet the one or more predefined web page criteria; and presenting, by the web editor, audit data from the audit report in the interface of the web editor in association with a presentation of the web page being edited in the interface by visually highlighting the one or more failing design elements directly within the design representation of the web page being edited in the interface.

2. The method of claim 1, wherein the generating by the web editor is in response to the indication for the audit of the web page.

3. The method of claim 1, wherein the presented audit data includes an audit score corresponding to the audit criteria.

4. The method of claim 1, further comprising determining a remedial action for the failing element based on a portion of the audit report corresponding to the failing element.

5. The method of claim 4, further comprising presenting the one or more remedial actions to the user in association with the presented audit data.

6. A non-transitory computer readable medium, comprising instructions for:

receiving an indication for an audit of a web page from a web editor, wherein the web page is being edited in an interface of the web editor that displays a design representation of the web page, wherein the audit is against one or more predefined web page criteria relating to usability of the web page;

generating, by the web editor and from the design representation displayed in the interface, an instance of the web page specifically for an audit;

submitting, by the web editor, the web page to a web assessment platform for the audit against the one or more predefined web page criteria;

receiving, at the web editor, an audit report associated with the web page, the audit report including audit data identifying one or more failing design elements of the web page corresponding to the design representation, wherein the failing design elements do not meet the one or more predefined web page criteria; and presenting, by the web editor, audit data from the audit report in the interface of the web editor in association with a presentation of the web page being edited in the interface by visually highlighting the one or more failing design elements directly within the design representation of the web page being edited in the interface.

7. The non-transitory computer readable medium of claim 4, wherein the generating by the web editor is in response to the indication for the audit of the web page.

8. The non-transitory computer readable medium of claim 6, wherein the presented audit data includes an audit score corresponding to the audit criteria.

9. The non-transitory computer readable medium of claim 6, further comprising instructions for determining a remedial action for the failing element based on a portion of the audit report corresponding to the failing element.

10. The non-transitory computer readable medium of claim 9, further comprising instructions for presenting the one or more remedial actions to the user in association with the presented audit data.

11. A system, comprising:

a processor; and a non-transitory computer readable medium comprising instructions for:

receiving an indication for an audit of a web page from a web editor, wherein the web page is being edited in an interface of the web editor that displays a design representation of the web page, wherein the audit is against one or more predefined web page criteria relating to usability of the web page;

generating, by the web editor and from the design representation displayed in the interface, an instance of the web page specifically for an audit;

submitting, by the web editor, the web page to a web assessment platform for the audit against the one or more predefined web page criteria;

receiving, at the web editor, an audit report associated with the web page, the audit report including audit data identifying one or more failing design elements of the web page corresponding to the design representation, wherein the failing design elements do not meet the one or more predefined web page criteria; and presenting, by the web editor, audit data from the audit report in the interface of the web editor in association with a presentation of the web page being edited in the interface by visually highlighting the one or more failing design elements directly within the design representation of the web page being edited in the interface.

12. The system of claim 11, wherein generating by the web editor is in response to the indication for the audit of the web page.

13. The system of claim 11, wherein the presented audit data includes an audit score corresponding to the audit criteria.

14. The system of claim 11, wherein the non-transitory computer readable medium further comprises instructions for determining a remedial action for the failing element based on a portion of the audit report corresponding to the failing element.

15. The system of claim 14, wherein the non-transitory computer readable medium further comprises instructions for presenting the one or more remedial actions to the user in association with the presented audit data.

\* \* \* \* \*